(12) United States Patent
Imamura et al.

(10) Patent No.: US 6,751,380 B1
(45) Date of Patent: Jun. 15, 2004

(54) FIBER GRATING AND METHOD AND APPARATUS FOR FABRICATING THE SAME

(75) Inventors: Kazuo Imamura, Hyogo (JP); Tadahiko Nakai, Hyogo (JP); Yasuhide Sudo, Hyogo (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 0 days.

(21) Appl. No.: 09/554,599

(22) PCT Filed: Nov. 25, 1998

(86) PCT No.: PCT/JP98/05311

§ 371 (c)(1),
(2), (4) Date: May 26, 2000

(87) PCT Pub. No.: WO99/27399

PCT Pub. Date: Jun. 3, 1999

(30) Foreign Application Priority Data

Nov. 26, 1997 (JP) .............................. 9-324167
Apr. 22, 1998 (JP) ........................... 10-112259
Jul. 17, 1998 (JP) ........................... 10-203077

(51) Int. Cl.[7] ................................. G02B 6/34
(52) U.S. Cl. ............................. 385/37; 385/10; 385/128
(58) Field of Search ........................... 385/37, 10, 123, 385/124, 128

(56) References Cited

U.S. PATENT DOCUMENTS 5,327,515 A * 7/1994 Anderson et al. ........... 385/123
5,773,486 A * 6/1998 Chandross et al. ........... 522/33

(List continued on next page.)

FOREIGN PATENT DOCUMENTS

| EP | 762158 | 3/1997 |
| JP | 5-506838 | 10/1993 |
| JP | 5-306147 | 11/1993 |

(List continued on next page.)

OTHER PUBLICATIONS

Dong, L. et al., "Enhanced Photosensitivity in Tin–Codoped Germanosilicate Optical Fibers" IEEE Photonics Technology Letters, IEEE, vol. 7(9), Sep. 1995, pp. 1048–1050.

Dong, L. et al., "Strong Photosensitive Gratings in Tin–Doped Phosphosilate Optical Fibers", Optics Letters, vol. 20(19), Oct. 1, 1995, pp. 1982–1984.

(List continued on next page.)

*Primary Examiner*—Frank G. Font
*Assistant Examiner*—Kevin C Kianni
(74) *Attorney, Agent, or Firm*—Nixon Peabody, LLP

(57) ABSTRACT

A core 2 is co-doped with Ge in a general concentration equivalent to that in a core of an optical fiber to be connected as well as Sn and Al in predetermined concentrations. A glass part F including the core and a cladding 3 is coated with a primary coat layer 4 of a UV transmitting resin which transmits UV of 240 nm through 270 nm but cures by absorbing UV of a shorter wavelength band than 240 nm or a longer wavelength band than 270 nm. A grating is written in the core by irradiating the core with UV through the primary coat layer. The primary coat layer is covered with a secondary coat layer 7 of a resin having a negative coefficient of linear expansion so as to cancel and suppress expansion/shrinkage of the glass part in accordance with temperature change derived from the positive coefficient of linear expansion. Thus, the invention provides a fiber grating and a method of fabricating a fiber grating, in which a grating can be easily written without causing degradation of the transmitting characteristic, the transmitting characteristic and the mechanical strength characteristic can be consistent with each other without spoiling improvement of productivity, and the temperature characteristic can be stabilized for attaining high reliability.

10 Claims, 18 Drawing Sheets

U.S. PATENT DOCUMENTS

| | | | | |
|---|---|---|---|---|
| 5,802,236 A | * | 9/1998 | DiGiovanni et al. | 385/127 |
| 5,859,944 A | * | 1/1999 | Inoue et al. | 385/73 |
| 5,867,618 A | * | 2/1999 | Ito et al. | 385/37 |
| 5,907,652 A | * | 5/1999 | DiGiovanni et al. | 385/125 |
| 6,069,988 A | * | 5/2000 | Kokura et al. | 385/37 |

FOREIGN PATENT DOCUMENTS

| | | |
|---|---|---|
| JP | 6-501783 | 2/1994 |
| JP | 7-230015 | 8/1995 |
| JP | 8-286056 | 11/1996 |
| JP | 9-113741 | 5/1997 |
| JP | 9-211245 | 8/1997 |
| JP | 9-288205 | 11/1997 |
| JP | 10-82919 | 3/1998 |
| WO | WO 97/14983 | 4/1997 |

OTHER PUBLICATIONS

Starodubov, D.S. et al., "Efficient Bragg Grating Fabrication in a Fibre Through its Polymer Jacket Using Near–UV Light", Electronics Letters, vol. 33, No. 15, Jul. 17, 1997, pp. 1331–1333.

Notice of Reasons of Rejection (MD970216) (Dated May 27, 2003).

Notice of Reasons of Rejection (MD980080) (Dated May 27, 2003).

* cited by examiner

FIBER GRATING AND METHOD AND APPARATUS FOR FABRICATING THE SAME

TECHNICAL FIELD

The present invention relates to a fiber grating in which a diffraction grating (grating) exhibiting a periodical index difference is written in a core of an optical fiber, and a method and an apparatus for fabricating the same.

BACKGROUND ART

A conventionally known fiber grating of this type includes a grating written in a core of an optical fiber by a two-beam interference method or a phase mask method (for example, as disclosed in Japanese Laid-Open Patent Publication No. 6-235808, Japanese Laid-Open Patent Publication No. 7-140311 and Japanese Patent No. 2521708). In such a fiber grating, a fused quartz (core) doped with germanium (Ge) is irradiated with a coherent UV laser beam so as to generate (write) a Bragg grating by causing photo-induced refractive index change in an irradiated portion.

The optical fiber used as the target for writing is generally obtained by coating a core and a cladding with a coat layer of a UV curable resin or the like that is cured by absorbing UV. The coat layer formed on a write target portion is generally removed in writing the grating through the UV irradiation in employing either of the two-beam interference method and the phase mask method, and the portion from which the coat layer is removed is coated again after completing writing the grating.

When the coat layer is removed, however, the outer face of a non-coated fiber (the outer face of the cladding) is exposed to air, and there is a fear of degradation of the non-coated fiber proceeded through the exposure to air during the writing work, which can degrade the transmitting characteristic. In addition, the coat layer of the write target portion is removed not by mechanical means but by a chemical treatment for dissolving it with, for example, a chemical, so as not to damage the non-coated fiber. Therefore, the removal of the coat layer is troublesome, which is a factor in degrading efficiency in mass processing for writing the grating.

On the other hand, in order to effectively write the grating by UV irradiation through the coat layer without removing the coat layer, sensitivity of the core of the optical fiber, that is, the target for writing, to the photo-induced refractive index change (photosensitivity) may be possibly increased. As means for increasing the photo sensitivity, namely, means for causing comparatively large photo-induced refractive index change, it has been proposed that the core corresponding to the target for writing is doped with Ge in a higher concentration (a concentration for attaining a relative refractive index difference between the core and the cladding of, for example, 1.5 through 2.0%) than a general concentration (a concentration for attaining the relative refractive index difference of, for example, 0.9%), or that the core is loaded with hydrogen at a high pressure after doping it with Ge in a general concentration (as described in the transactions of the Institute of Electronics, Information and Communication Engineers, Vol. J79-C-1, No. 11, p. 415, November 1996).

When a fiber grating is fabricated by using a core doped with Ge in a higher concentration, however, the following problem occurs in connecting this fiber grating between general optical fibers so as to be used as a filter or the like: Since the core of the optical fiber connected (fused) to the fiber grating has the general specifications doped with Ge in the general concentration, the cores cannot be matched and a difference in the concentration of the doped Ge increases connection loss. On the other hand, when a core loaded with hydrogen at a high pressure is to be used for fabricating a fiber grating, the loaded hydrogen is diffused with time, and the core returns to the original state prior to the hydrogen loading in a comparatively short period of time (for example, several days). Therefore, the time period for forming the grating by the UV irradiation is limited to a rather short period, and additionally, it is difficult to control the wavelength in the UV irradiation because it is necessary to write the grating in consideration of the diffusion of hydrogen.

Furthermore, when a fiber grating where a grating has been written is expanded or shrunken due to an influence of temperature change or an externally applied tensile force, the reflective wavelength of the grating is shifted. Therefore, a fiber grating is required to have a mechanical strength characteristic and a stable temperature characteristic that it cannot be expanded/shrunken by temperature change.

The present invention was devised in consideration of these circumstances, and an object is providing a fiber grating in which a grating can be easily written without causing degradation of the transmitting characteristic. In addition, another object is providing a highly reliable fiber grating by stabilizing not only the transmitting characteristic but also the temperature characteristic.

Another object of the invention is providing a fiber grating and a method of fabricating the same in which the transmitting characteristic and the mechanical strength characteristic can be consistent with each other without spoiling improvement of productivity.

DISCLOSURE OF THE INVENTION

The fiber grating of this invention includes a core where a grating is written, a cladding for covering the core, and a UV transmitting resin layer for coating the outer face of the cladding, and the grating is written in the core by irradiating the core through the resin layer with UV of a specific wavelength band.

Since the coat layer covering the core and the cladding is made from a UV transmitting resin in this fiber grating, even when UV is irradiated through the coat layer, the UV transmits the coat layer to effectively irradiate the core, so that the grating can be written in the core. Accordingly, the grating can be written without removing the coat layer. Therefore, it is possible to avoid degradation of the transmitting characteristic accompanied by the removal of the coat layer as well as to easily fabricate the fiber grating with a process for removing the coat layer omitted.

The coat layer of the UV transmitting resin has a characteristic of transmitting at least UV of a specific wavelength band used for writing the grating. In this case, a preferred coat layer of a UV transmitting resin is concretely specified as follows: The preferred coat layer transmits UV of the specific wavelength band used for writing the grating, for example, a wavelength band of 250 nm through 270 nm. The UV transmitting resin may have a specific wavelength band (transmitting band) within a range between 250 nm and 350 nm. As a light source of the UV having such a wavelength band, one having high spatial coherency, such as solid laser, is preferably used.

The coat layer has a characteristic of curing by absorbing UV in a shorter wavelength band or a longer wavelength band than the specific wavelength band used for writing the grating.

In using the coat layer of this invention, the grating can be written by UV irradiation through the coat layer because it transmits UV in the specific wavelength band, and at the same time, the coat layer absorbs UV and cures in the formation thereof so as to work as a protecting coat of the optical fiber.

The core is preferably co-doped with at least Sn addition to Ge in an amount equivalent to that in the core of an optical fiber to be connected. The amount of Ge to be doped is preferably that for attaining a relative refractive index difference between the cladding and the core of approximately 0.9%, while the concentration of Sn is preferably 10000 through 15000 ppm.

The co-doped Sn (tin) stationary increases the photo-induced refractive index change of the core as compared with a core doped with Ge alone in a general concentration. As a result, the reflectance attained by irradiating with the UV can be increased as compared with that of the core doped with Ge alone in the general concentration. Specifically, a specific wavelength (Bragg wavelength) $\lambda B$ reflected by a grating is represented by the following formula (1), and the reflectance RB for reflecting light of the Bragg wavelength is represented by the following formula (2):

$$\lambda B = 2 \cdot n \cdot P \qquad (1)$$

n: Effective refractive index
P: Grating pitch $$RB = \tanh^2 (\pi \cdot L \cdot \Delta n \cdot \eta / \lambda B) \qquad (2)$$

L: Grating length
$\Delta n$: Refractive index modulation
$\eta$: Propagation optical energy included in a core region In the case where the core co-doped with Sn is irradiated with UV, the refractive index modulation $\Delta n$ is larger than in the cored doped with Ge alone in the general concentration, resulting in increasing the reflectance RB. Accordingly, by forming the coat layer from the UV transmitting resin, not only the grating can be effectively written without removing the coat layer but also the co-doped Sn can increase the reflectance of the written grating.

In addition, since the concentration of the doped Ge is equivalent to that in the core of an optic al fiber to be connected, connection loss can be prevented from increasing even when the fiber grating is connected to the optical fiber with the general specifications. Moreover, since the reflectance can be stationarily increased by co-doping Sn without conducting the high pressure hydrogen loading, the restriction in the time period for forming a grating as in the case where the high pressure hydrogen loading is conducted can be avoided.

The mechanism of the photo-induced refractive index change through UV irradiation has not been made clear yet although various ideas including the following have been proposed: An idea based on the Kramers-Kronig mechanism that the refractive index change is caused due to the bond between a Ge atom and $SiO_2$ (quartz glass) changed through the UV irradiation; an idea based on a compression model that a glass bond cut through the UV irradiation causes collapse of the glass structure so as to increase the density, resulting in increasing the refractive index; and an idea based on a dipole model. Also, the mechanism of increase of the photo-induced refractive index change by co-doping Sn has not been made clear. The present inventors have, however, variously examined and tested materials to be doped in a core, premising that the high pressure hydrogen loading, which requires troubles and rather long time (for example, of two weeks) and is restricted in the time period for forming a grating, is not used and that the amount of Ge to be doped is set equivalently to that of the general specifications for avoiding the connection loss, resulting in finding that the reflectance can be increased by co-doping Sn as described above without causing the conventional problems.

Furthermore, the coat layer of the UV transmitting resin is preferably covered with a secondary coat layer after writing the grating. The secondary coat layer is formed from a material having a negative coefficient of linear expansion so as to cancel the expansion, caused by temperature change, of a glass part of the optical fiber having a positive coefficient of linear expansion. The secondary coat layer having a negative coefficient of linear expansion is formed from, for example, a liquid crystal polymer (LCP). In using the LCP, even when the core and the cladding show an expanding tendency due to temperature change, for example, temperature increase, the secondary coat layer shows a shrinking tendency, thereby suppressing canceling the expanding tendency of the core and the cladding. As a result, the fiber grating is never expanded/shrunken by the temperature change but remains in the state prior to the temperature change, namely, the stability against the temperature change is improved. Thus, the shift of the reflective wavelength derived from the expansion/shrinkage can be prevented and suppressed, so as to definitely keep the constant reflecting function. In this case, between the core and the cladding showing the expanding tendency and the secondary coat layer showing the shrinking tendency, the primary coat layer of the UV transmitting resin adhered onto the both interfaces works as a buffer layer for canceling the expansion/shrinkage. Also, by forming the secondary coat layer not only on the portion for writing the grating but also over the entire length of the optical fiber constituting the fiber grating, the stability against the temperature change can be improved as well as the mechanical strength characteristic against externally applied tension can be improved.

In the method of fabricating a fiber grating of this invention, a coat layer is formed in a comparatively large specific thickness for attaining the mechanical strength characteristic, and thereafter, UV is irradiated through the thick coat layer. Even in this case, when the irradiation energy is set within a specific range, it is possible to obtain a fiber grating having a transmitting characteristic with high reflectance without degrading the strength of the coat layer.

Specifically, after forming the coat layer of a UV transmitting resin in a large thickness so as to attain a mechanical strength characteristic equivalent to that of a coated fiber to be connected to the fiber grating, the UV irradiation is conducted at an irradiation energy density of at least approximately 1.5 through 4.0 kJ/cm$^2$. In this case, even when the coat layer has a large thickness for attaining the mechanical strength characteristic equivalent to that of the coated fiber to be connected, a grating having a good transmitting characteristic with high reflectance can be written in the core, that is, the target for writing, by conducting the UV irradiation at the aforementioned irradiation energy density, and degradation of the strength of the glass part and the coat layer due to the UV irradiation can be minimized so as to keep the aforementioned mechanical strength characteristic. In addition, since the thick coat layer is formed before writing the grating, the fiber grating can be mass produced without spoiling improvement of productivity. Fiber gratings are classified into a short-period fiber grating for attaining refractive index modulation of a 0.5 $\mu$m period for realizing back coupling to a core and a long-period fiber grating for attaining refractive index modulation of a 100 through 500 μm period for realizing front coupling to a cladding, to both types of which the invention is applicable.

From the viewpoint of productivity, the coat layer is most preferably formed by single coating immediately after drawing a non-coated fiber. The "thickness" of the coat layer may be determined so as to attain, after writing the grating, substantially the same mechanical strength characteristic as that of a general communication coated fiber to be connected to the fiber grating. Specifically, the thickness is at least approximately 30 μm. In a non-coated fiber of 125 μm, the coat layer is preferably formed in a thickness of 30 through 50 μm, for example, of 37.5 μm. According to this invention, since the coat layer is not removed in writing the grating, the strength of the optical fiber is minimally reduced, and hence, sufficient mechanical strength can be attained even when the coat layer has a thickness of 50 μm or less.

Also, the "irradiation energy density" of the UV is preferably set within the range between 1.5 and 4.0 kJ/cm$^2$ in order to suppress increase of the Young's modulus of the coat layer within a predetermined range. The UV irradiation may be conducted by any of various methods, for example, by repeating irradiation at a predetermined pulse frequency with a short pulse width and with a constant energy of each pulse; by continuous irradiation; and by intermittent irradiation with large energy at intervals.

The UV irradiation at such an irradiation energy density may be conducted with the UV converged by a cylindrical lens, and in this case, the entire coat layer is placed in a position within a beam pattern of the UV converged toward a focal point.

When UV is converged by the cylindrical lens, the irradiation density of the UV is highest at the focal point. However, when the UV irradiation is conducted through the coat layer of the coated fiber as the target for writing, the coat layer can be locally damaged, for example, burnt or changed in color (yellowed) by placing the coated fiber on the focal point. When the entire coat layer is placed within the beam pattern as described above, the coated fiber can be uniformly irradiated at the predetermined irradiation density without damaging the coat layer. In addition, from the viewpoint of shortening time for the irradiation process, the coated fiber as the target for writing is most preferably placed not only within the beam pattern but also in a position where the outer face of the coat layer of the coated fiber is internally in contact with the outer edge of the beam pattern. Specifically, the position for attaining the internal contact corresponds to a position closest to the focal point and a position for the entire coat layer placing within the beam pattern, and hence, the UV can be irradiated at the highest irradiation density in a range where the damage of the coat layer is avoided.

Moreover, when the core is loaded with hydrogen before the UV irradiation, the photo-induced refractive index change caused by the UV irradiation can be increased, resulting in forming a grating with further higher reflectance. Furthermore, when the core as the target for writing is co-doped with at least Sn in addition to Ge, the photo-induced refractive index change caused by the UV irradiation can be increased even if the concentration of the doped Ge is equivalent to that in a coated fiber to be connected, resulting in forming a grating with further higher reflectance.

In conducting the UV irradiation through the coat layer, when the fiber grating is to be fabricated by irradiating with UV converged by the cylindrical lens, the optical fiber bearing the coat layer is preferably placed in a position between the cylindrical lens and a focal point of the cylindrical lens so that the entire optical fiber including the coat layer can be positioned within a beam pattern of the UV converged toward the focal point by the cylindrical lens.

Since the irradiation density of the UV is the highest at the focal point to which the UV is converged by the cylindrical lens, when the UV irradiation is conducted not through the coat layer but with the coat layer removed, the glass part from which the coat layer is removed is disposed as close as possible to the focal point. However, when the UV irradiation is conducted through the coat layer as in this invention, the coat layer is locally damaged to be burnt or changed in color (yellowed) by disposing the coated fiber on the focal point. When the coated fiber is disposed so as to place the entire coat layer within the beam pattern, however, the coated fiber can be uniformly irradiated at the predetermined irradiation density without damaging the coat layer.

In particular, the coated fiber is most preferably placed not only within the beam pattern but also in a position where the outer face of the coat layer is internally in contact with the outer edge of the beam pattern. Specifically, the position for attaining the internal contact corresponds to a position closest to the focal point and a position for the entire coat layer placing within the beam pattern. Therefore, the UV can be irradiated at the highest irradiation density within the range where the damage of the coat layer is avoided. In this manner, the time required for writing the grating can be shortened, resulting in improving the efficiency of fabrication of the fiber grating.

The core is preferably loaded with hydrogen before the UV irradiation, or preferably co-doped with at least Sn in addition to Ge.

In another method of fabricating a fiber grating of this invention, a grating is written in a state where tensile strain is caused by applying a tensile force. Thereafter, when the applied tensile force is released so as to elastically restore the tensile strain, the grating pitch of the grating written in a core is narrowed correspondingly to the elastically restored tensile strain. Thus, the wavelength characteristic can be shifted toward a shorter wavelength, and in addition, the shift toward a shorter wavelength can be stably kept.

Specifically, according to the invention, a tension application step of causing tensile strain along a fiber axial direction by previously applying a tensile force along the fiber axial direction to a portion for writing a grating of an optical fiber to be fabricated into a fiber grating; an irradiation step of writing the grating with a predetermined grating pitch along the fiber axial direction in the core of the optical fiber by irradiating, with UV, the optical fiber with the tensile force applied in the tension applying step; and a tension release step of shifting the grating pitch of the grating written in the core toward a shorter wavelength by releasing the applied tensile force after the irradiation step are executed.

In this case, tensile strain (expansion strain) is caused along the fiber axial direction in the core of the optical fiber in the tension application step, so as to keep the core to be expanded along the fiber axial direction. Next, the irradiation step is conducted under this condition, so as to write the grating with the predetermined grating pitch in the expanded core. Then, the tensile force applied to the optical fiber where the grating has been written is released in the subsequent tension release step, thereby elastically restoring the expansion strain. Accordingly, the grating pitch of the written grating is shifted to be narrowed. As a result, the wavelength of light reflected by the grating is shifted toward a shorter wavelength correspondingly to the narrowed grating pitch. Therefore, the shift control of the wavelength characteristic toward a shorter wavelength, which cannot be realized by a conventional tension applying method for keeping an applied tensile force after writing a grating, can be realized by the present method. Also, in this case, differently from the conventional tension applying method, the grating is written under application of the tensile force and the tensile force is released thereafter. Therefore, the grating shifted toward a shorter wavelength is stably formed in the core of the optical fiber under application of no load, and hence, the wavelength characteristic shifted toward a shorter wavelength of the fiber grating can be stably obtained. Moreover, as compared with the conventional tension applying method, there is no need to keep the applied tension in an individual optical fiber, and therefore, a fiber grating easily dealt with and controlled in the wavelength by tension application can be easily mass produced.

The optical fiber used in the fabrication of the fiber grating may be a non-coated fiber formed of a core and a cladding, namely, one excluding a coat layer, which does not limit the invention, and a coated fiber obtained by coating the non-coated fiber with a coat layer can be used. In this case, in order to transmit UV for effectively causing the photo-induced refractive index change in the core through the UV irradiation, the coat layer is preferably formed from a UV transmitting resin. When the UV irradiation is conducted through the coat layer, the tensile force applicable in the tension application step can be set to a large value, and as the value of the applied tensile force is larger, the tensile strain caused in the core can be larger so as to increase the elastic restoration obtained in the tension release step, namely, the narrowed grating pitch. As a result, the shift of the wavelength characteristic toward a shorter wavelength can be increased, so as to enlarge the range for the wavelength control. For example, since a non-coated fiber is generally broken when a tensile force corresponding to expansion of 1% is applied, the tension application step is conducted in a small tension region where a smaller tensile force is applied. However, since the expansion where a fear of fracture occurs is generally 6% in a coated fiber, when the coated fiber is used in the tension application step, a large tensile force corresponding to the expansion of at least 4% or more can be applied.

Furthermore, after applying and releasing the tensile force for the wavelength control, a screening step of conducting a screening test on the portion of the fabricated fiber grating where the grating has been written by applying a predetermined tensile force may be carried out. Thus, a test on the mechanical characteristic of the portion where the grating is written with the wavelength controlled, namely, a test on the strength and surface damage, can be conducted following the fabrication of the fiber grating, and this method is suitable for a mass production system for fiber gratings.

The screening step may be conducted subsequently to a general fiber grating fabrication method in which the irradiation step alone is conducted for writing a grating without conducting the tension application step and the tension release step. Thus, in the fabrication of a fiber grating, writing of the grating and the screening test for the fiber grating where the grating has been written can be carried out in continuous procedures, and this is also suitable for the mass production system for fiber gratings.

The fiber grating fabrication apparatus of this invention includes a UV irradiation system for irradiating an optical fiber with UV so as to write a grating with a predetermined grating pitch along a fiber axial direction in a core of the optical fiber; and a tension applying mechanism for causing, by temporarily applying a tensile force, tensile strain along the fiber axial direction in a portion of the optical fiber irradiated with the UV by the UV irradiation system.

The "UV irradiation system" includes any apparatus and mechanism for writing a grating by irradiating, with UV and preferably a UV laser beam, the optical fiber over a range in the axial direction for writing the grating, and includes, for example, a laser source, a phase mask, a mechanism for changing a position irradiated with the laser beam and the like. Also, the "tension applying mechanism" may be realized by a structure for fixing the positions of two portions of the optical fiber sandwiching the portion irradiated with UV by using adhering or frictional means and for applying a tensile force to the portion irradiated with UV by moving one or both of the fixed portions along the axial direction.

The tension application step is conducted by the tension applying mechanism for applying and keeping the tensile force along the fiber axial direction to the portion irradiated with UV, and the irradiation step is conducted by the UV irradiation system for irradiating with UV with the tensile force applied. Thus, the grating can be written through the UV irradiation in the core where tensile strain along the fiber axial direction is caused by the tension application. Then, the tension release step is carried out by releasing the applied tensile force by the tension applying mechanism after writing the grating. In this manner, the core shrinks along the fiber axial direction to restore, and the written grating shrinks in the fiber axial direction in accordance with the shrinkage of the core, resulting in narrowing the grating pitch as compared with that initially written. As a result, the wavelength of light reflected by the grating can be shifted toward a shorter wavelength than that reflected by the initially written grating.

The "tension applying mechanism" may be specifically constructed from a pair of fixing means for fixing two portions of the optical fiber away from each other in the fiber axial direction and sandwiching the portion irradiated with UV by the UV irradiation system; and moving means for forcedly moving at least one of the pair of fixing means away from and toward the other along the fiber axial direction. More specifically, an example of the "fixing means" is a winding reel for winding the optical fiber around an axis perpendicular to the fiber axial direction so as to fix the optical fiber by using friction against the optical fiber. Specifically, by winding the optical fiber around the circumference of the winding reel, the optical fiber is fixed so as not to relatively move along the axial direction by using frictional resistance caused between the optical fiber and the circumference of the winding reel. In this case, the winding reel to be moved by the moving means is rotatably supported around the perpendicular axis in one position along the fiber axial direction, and the "moving means" is constructed from a motor for forcedly rotating, by predetermined revolutions, the winding reel to be moved with the optical fiber wound. Since the optical fiber is fixed in its position by using the frictional resistance, the optical fiber can be fixed with no fear of damage caused in the optical fiber itself, and when the winding reel is forcedly rotated by the motor around the center axis thereof, a tensile force can be easily and definitely applied to the optical fiber. The "winding reel" is in a cylindrical or a column shape, and from the viewpoint of easiness in controlling the tension application, the "motor" is preferably a pulse motor or the like whose revolutions can be determined in proportion to the number of input pulses.

Moreover, in using the fiber grating fabrication apparatus, when the irradiation step and the screening step alone are to be conducted, the writing of the grating and the screening test of the fiber grating where the grating has been written can be both carried out in the same fabrication apparatus. Specifically, after writing the grating, through the UV irradiation by the UV irradiation system, in the optical fiber under application of no load, a tensile force for causing predetermined expansion strain along the fiber axial direction for the screening test is applied by the tension applying mechanism.

BEST MODE FOR CARRYING OUT THE INVENTION

Embodiment 1

An embodiment of a fiber grating according to the invention will now be described with reference to the accompanying drawings.

Figure 1:
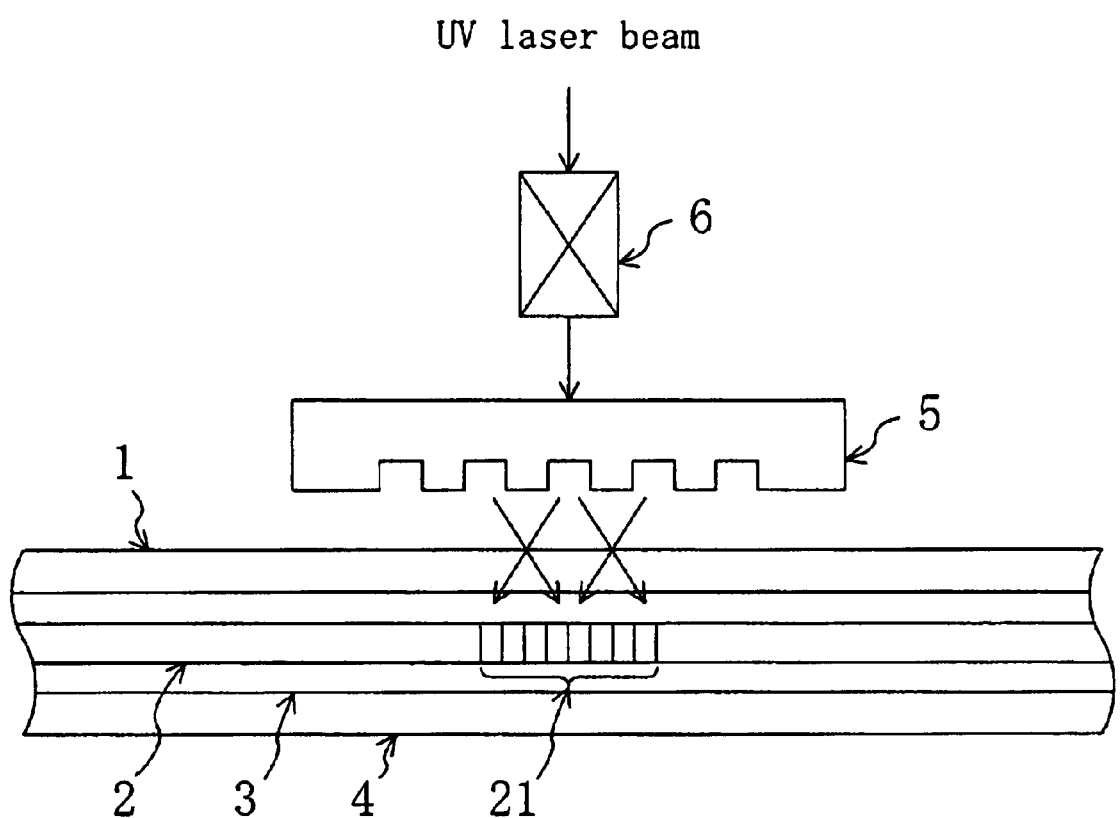
FIG. 1 is a schematic diagram for showing a method of writing a grating according to an embodiment of the invention.

FIG. 1 shows the principle of a method of fabricating a fiber grating of this embodiment. In FIG. 1, a coated fiber 1 in a given length serving as a target for writing a grating is shown. The coated fiber 1 includes a core 2 in which a Bragg grating 21 is to be written, a cladding 3 formed around the core 2, and a coat layer 4 for coating the outer face of the cladding 3.

The core 2 is doped with Ge in a concentration equivalent to that of Ge included in the core of an optical fiber with the general specifications. In order to stationarily increase photo-induced refractive index change, the core 2 is preferably doped not only with Ge but also with another dopant of Sn, Sn and Al, or Sn, Al and B. Herein, an optical fiber with the general specifications means a coated fiber to be connected to the coated fiber 1. The core of the coated fiber with the general specifications is generally doped with Ge in a concentration for attaining a relative refractive index difference of approximately 0.9%.

The core 2 of the coated fiber 1 is doped not only with Ge in a concentration equivalent to that in the core of the optical fiber with the general specifications (a concentration for attaining a relative refractive index difference of approximately 0.9%) but also with Sn in a concentration of 10000 ppm or more, and preferably 10000 through 15000 ppm. In addition to Sn in such a concentration, Al or the like in a concentration of 1000 ppm or less can be co-doped.

The addition of the dopant can be carried out by any of various known methods. For example, when the addition is carried out by immersion, a compound of Ge or Sn (with respect to Sn, for example, $SnCl_2 \cdot 2H_2O$) is mixed with methyl alcohol, and the core is immersed in the resultant solution.

The primary coat layer 4 is made from a UV transmitting resin having a characteristic of transmitting UV. The primary coat layer 4 may be made from any resin that can transmit at least a specific wavelength band (for example, a wavelength band of 250 nm through 270 nm) of UV irradiated for writing the grating 21. Preferably, it is made from a resin that scarcely absorbs but transmits UV in the specific wavelength band but cures by absorbing UV of a wavelength shorter than or longer than the specific wavelength band. Specifically, the primary coat layer 4 is most preferably formed from a resin that exhibits different UV absorbing characteristics depending upon the wavelength so that it can be of the UV transmitting type against the specific wavelength band and of the UV curable type against a wavelength shorter than or longer than the specific wavelength band. Urethane type acrylate or epoxy type acrylate including a photoinitiator for starting/accelerating a curing reaction when irradiated with UV of a wavelength, for example, shorter than 240 nm or longer than 270 nm is used as such a resin.

Next, the grating 21 is written in the coated fiber 1 including the core 2 co-doped with Ge, and Sn or Sn and Al in a predetermined concentration, and the primary coat layer 4 of the UV transmitting resin.

The grating 21 can be written by any of various known methods. For example, the phase mask method can be employed. In this case, a phase mask 5 in the shape of a grating is disposed on the immediate side of the coated fiber 1 as is shown in FIG. 1, so that the phase mask 5 can be irradiated with a UV laser beam through a cylindrical lens system 6. At this point, coherent UV light of, for example, 266 nm corresponding to a frequency-quadrupled wavelength of that of Nd-YAG laser is used for the irradiation. Thus, the grating 21 with a grating pitch corresponding to the grating pitch of the phase mask 5 is written in the core 2.

In writing the grating 21, since the primary coat layer 4 constituting the outer face layer of the coated fiber 1 is made from the UV transmitting resin, it can transmit the UV laser beam so that the core 2, that is, the target for writing, can be effectively irradiated. As a result, the grating 21 can be easily written in the core 2. Accordingly, the grating 21 can be easily written without removing the primary coat layer, and hence, the conventional troublesome process for removing the coat layer can be omitted. Thus, mass production of the fiber grating can be easily and efficiently carried out.

Since the core 2 corresponding to the target for writing is co-doped with Sn or Sn and Al in addition to Ge, the irradiation with the UV laser beam can cause comparatively large photo-induced refractive index change (namely, the photo sensitivity can be improved), so as to form the grating 21 with high reflectance. Moreover, since the high reflectance of the grating 21 can be thus attained by doping the core with Ge in the same amount as that in the optical fiber with the general specifications, there is no fear of occurrence of connection loss derived from mismatching in the amount of doped Ge even when the both ends of the coated fiber 1 constituting the fiber grating are connected to coated fibers with the general specifications. In addition, since the increase of the photo-induced refractive index change is stationary, it is possible to avoid the restriction in the period for forming the grating as in the case where the high reflectance is attained by conducting the high pressure hydrogen loading.

Figure 2:
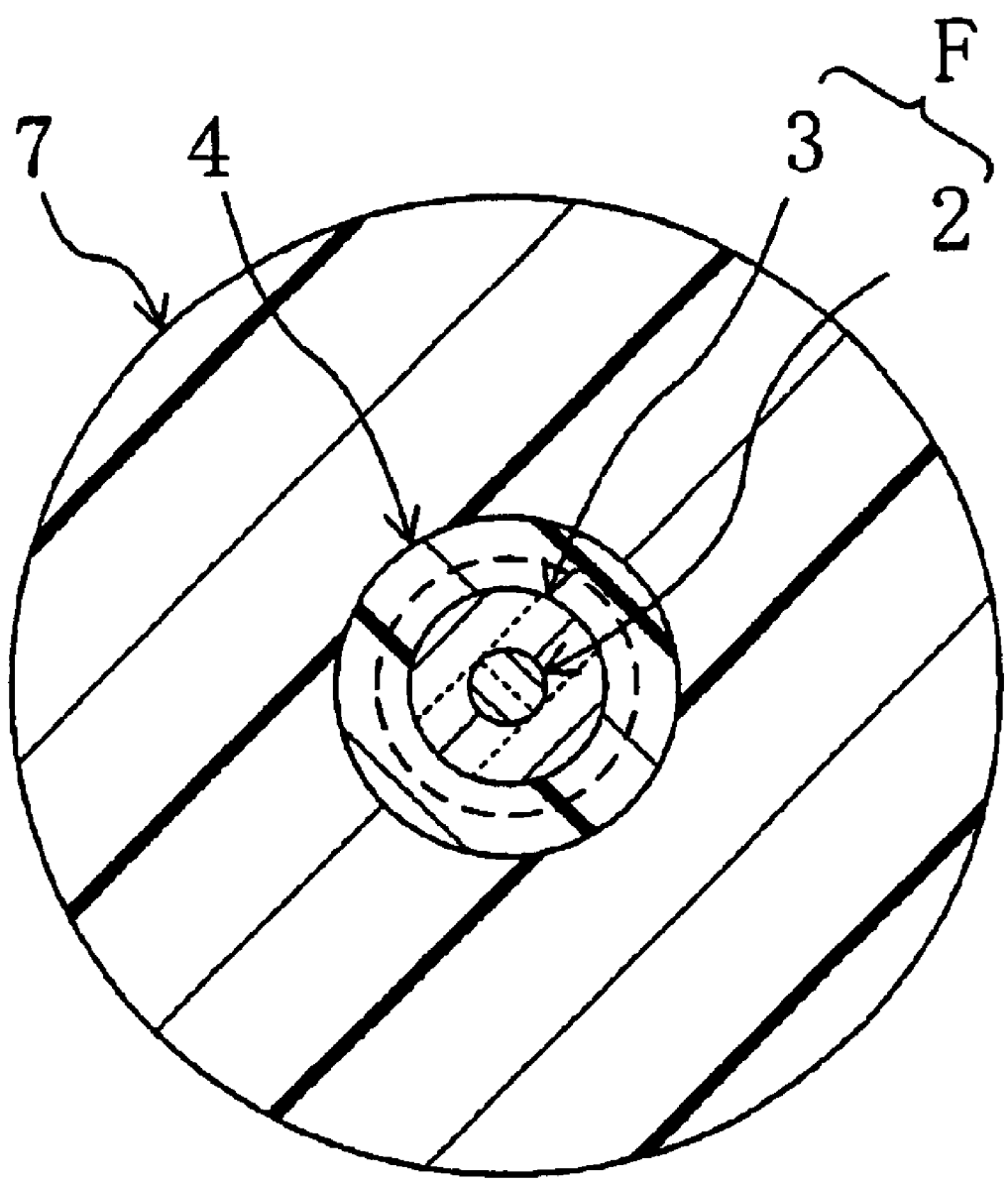
FIG. 2 is a horizontal sectional view of a coated fiber obtained by further coating a coated fiber of FIG. 1 with a secondary coat layer.

The outer face of the primary coat layer 4 of the coated fiber 1 in which the grating 21 is written as described above can be further covered, as is shown in FIG. 2, continuously along the entire length of the coated fiber 1 with a secondary coat layer 7 having a negative coefficient of linear expansion. In this manner, anultimate coated fiber including the fiber grating is obtained.

The secondary coat layer 7 has a temperature characteristic of expanding/shrinking in a direction for suppressing and canceling expansion/shrinkage, according to temperature change, of a glass part F including the core 2 and the cladding 3, so that the expansion/shrinkage of the entire fiber grating according to the temperature change can be suppressed and prevented as far as possible. Specifically, the secondary coat layer 7 is made from a resin having a negative coefficient of linear expansion balanced with the positive coefficient of linear expansion of the glass part F. More specifically, the negative coefficient of linear expansion, the Young's modulus and the cross-sectional area (the outer diameter or the thickness) of the secondary coat layer 7 are determined so that the temperature characteristic of the glass part F in view of the hardness (Young's modulus) and the cross-sectional area in addition to the positive coefficient of linear expansion of the glass part F can be balanced with the temperature characteristic of the secondary coat layer 7 in view of the hardness (Young's modulus) and the cross-sectional area in addition to the negative coefficient of linear expansion of the secondary coat layer 7, namely, the positive and negative temperature characteristics can be balanced.

Figure 3:
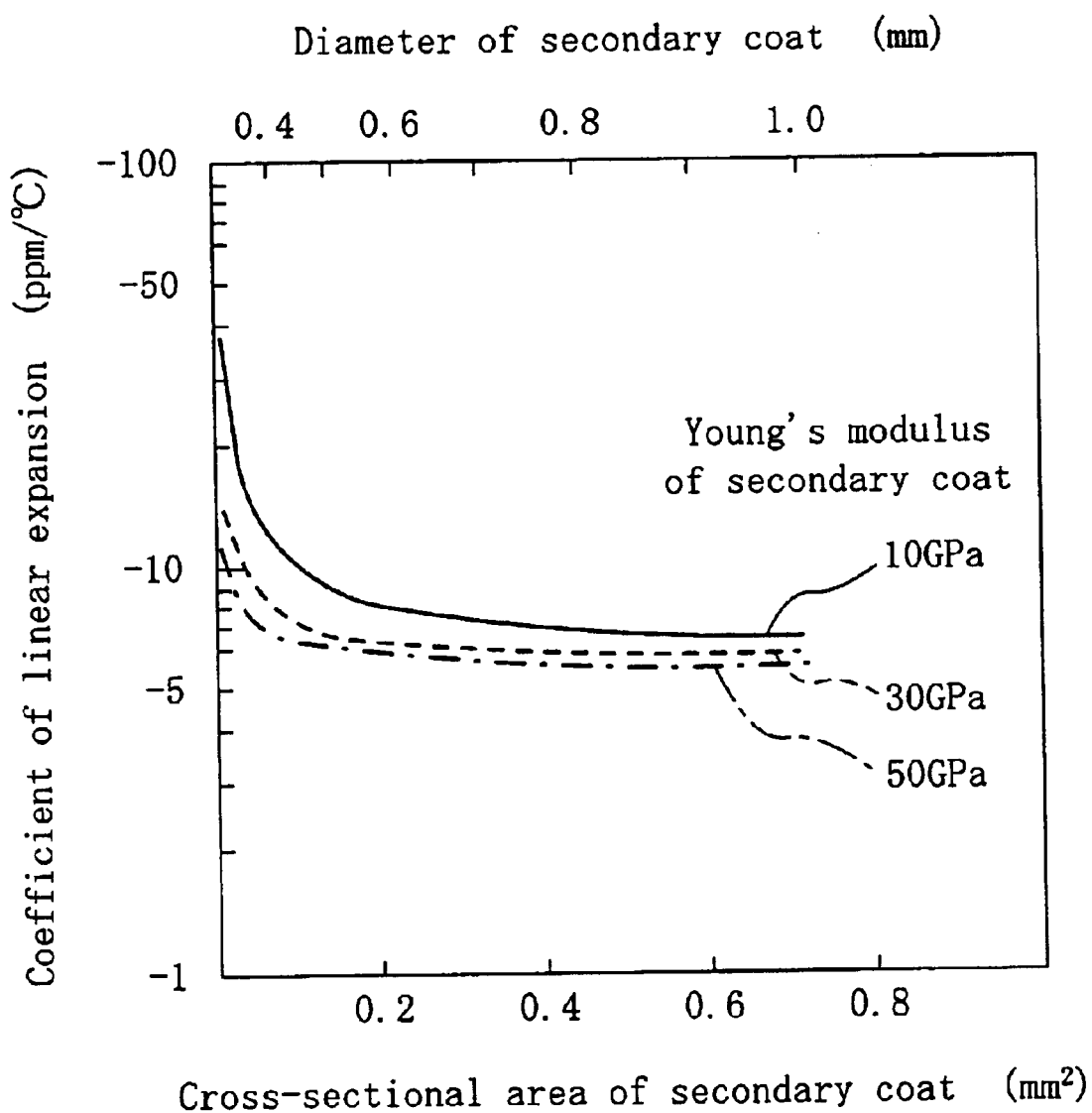
FIG. 3 is a diagram for showing a necessary coefficient of linear expansion of the secondary coat layer as the relationship between a cross-sectional area and a Young's modulus.

An example of the concrete specifications of the secondary coat layer 7 determined in accordance with this course will now be described with reference to FIG. 3. In the case where the positive coefficient of linear expansion of the glass part F is 0.6 ppm/° C., the Young's modulus is 73 GPa, the cross-sectional area is 0.0123 mm$^2$ (with an outer diameter of 0.125 mm) and the outer diameter of the primary coat layer 4 is 0.25 mm, the concrete specifications of the secondary coat layer 7 are shown in FIG. 3 with the cross-sectional area, the coefficient of linear expansion and the Young's modulus of the secondary coat layer 7 used as parameters. Specifically, in the case where the Young's modulus of the secondary coat layer 7 is set to 10 GPa, 30 GPa or 50 GPa and the cross-sectional area is changed by variously changing its outer diameter, the negative coefficient of linear expansion of the secondary coat layer 7 required to be balanced with the positive temperature characteristic of the glass part F can be obtained from FIG. 3. According to FIG. 3, the secondary coat layer 7 should have a coefficient of linear expansion of −5 ppm/° C. through −10 ppm/° C. regardless of the cross-sectional area excluding a region where the cross-sectional area is as small as 0.1 mm$^2$ or less. In addition, as the value of the Young's modulus is larger (harder), the absolute value of the negative coefficient of linear expansion can be smaller, and as the value of the Young's modulus is smaller (softer), the absolute value of the negative coefficient of linear expansion should be larger because it is necessary to more largely shrink in accordance with the temperature change, but the change of the negative coefficient of linear expansion against the change of the Young's modulus is limited to a comparatively small range. Also, including the case where the cross-sectional area is very small, the coefficient of linear expansion required of the secondary coat layer 7 may be set to −5 ppm/° C. or less. An example of the resin for forming such a secondary coat layer 7 is Vectra A950 (product name available from Polyplastics Co., Ltd.), that is, a liquid crystal polymer material having a coefficient of linear expansion of −5 ppm/° C. or less and a Young's modulus of 10 GPa or more.

In the exemplified case shown in FIG. 3, the primary coat layer 4 has a coefficient of linear expansion of 100 ppm/° C. and a Young's modulus of 1 through 500 MPa.

Since the coated fiber 1' included in the fiber grating is covered with the secondary coat layer 7 having the negative coefficient of linear expansion, the expansion/shrinkage of the fiber grating can be suppressed and prevented even when the temperature changes, so that the function of the written grating 21, namely, the function to reflect light of a specific wavelength, can be kept as desired. Specifically, although the glass part of the fiber grating is to extend through expansion due to its positive coefficient of linear expansion in accordance with increase of the atmosphere temperature, the secondary coat layer 7 is to shrink due to its negative coefficient of linear expansion in accordance with the temperature increase. Accordingly, the expanding force of the glass part F and the shrinking force of the secondary coat layer 7 are mutually interfered through the primary coat layer 4 to be balanced, resulting in suppressing and preventing the expansion of the glass part F and keeping it in the same state as that attained prior to the temperature increase.

In addition, the secondary coat layer 7 is formed not locally in the portion for writing the grating 21 but continuously along the entire length of the coated fiber 1' constituting the fiber grating. Therefore, the balance between the expanding force of the glass part F and the shrinking force of the secondary coat layer 7 can be attained along the entire length of the coated fiber 1', resulting in stabilizing the mechanical strength characteristic of the entire fiber grating.

Figure 4:
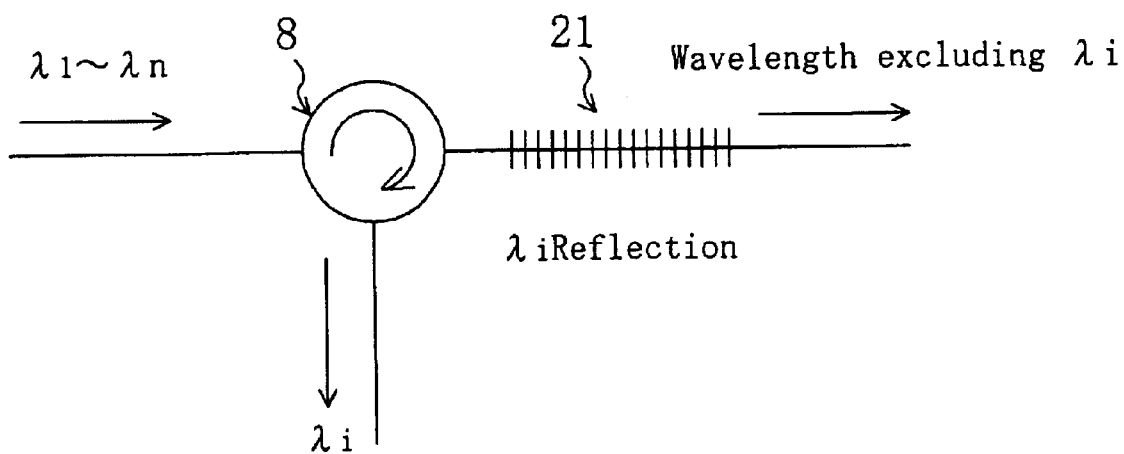
FIG. 4 is a schematic diagram of a use for a fiber grating of the embodiment.

Examples of the use of the fiber grating in which the grating 21 is written are as follows: For example, when it is used as an optical demultiplexer or an optical multiplexer, in transmitting light of a wavelength band with a comparatively small width including a large number of different wavelengths $\lambda 1$ through $\lambda n$ as is shown in FIG. 4, light of a specific wavelength $\lambda i$ alone can be reflected so as to isolate the light of the specific wavelength $\lambda i$ through a circulator 8. This structure can be used, for example, in the field of Add-Drop type wavelength division multiplex communications.

Figure 5:
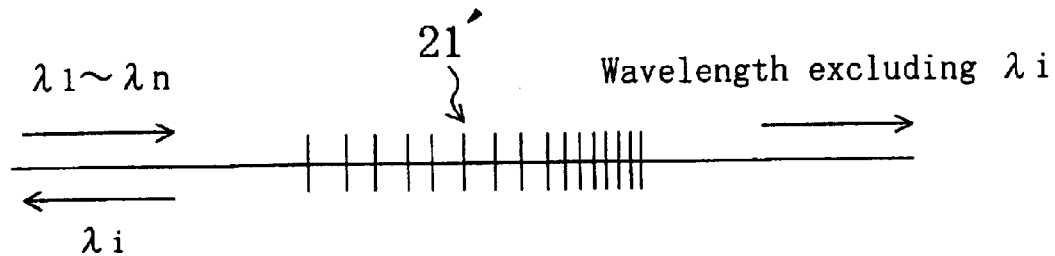
FIG. 5 is a schematic diagram of another use different from that of FIG. 4.

Alternatively, it can be formed as a chirped fiber grating 21' as is shown in FIG. 5 so as to be used as a substitute for a multi-layered film filter. Specifically, light of a specific wavelength band (a center wavelength $\lambda i$) among plural wavelength bands ($\lambda 1$ through $\lambda n$) can be reflected so as to cut the light of the specific wavelength band and transmit light of the wavelength bands other than specific wavelength band. As an example of the application of the chirped fiber grating 21', by utilizing the delay characteristic that light of a longer wavelength in the specific wavelength band is reflected at the earlier stage and light of a shorter wavelength is reflected later, it can be used as a dispersion compensator for taking out the reflected wave by using a circulator and transmitting it in a dispersed state.

Figure 6:
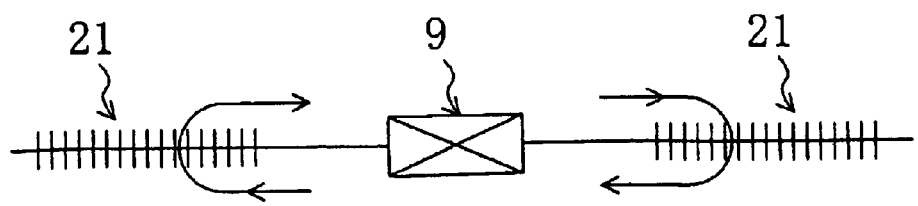
FIG. 6 is a schematic diagram of still another use different from those of FIGS. 4 and 5.

Furthermore, when the grating 21 is formed on both sides of an amplifier medium 9 as shown in FIG. 6, a resonator in which each grating 21 works as a laser mirror can be obtained. Specifically, light of a specific wavelength is reflected between the gratings 21 on both sides of the amplifier medium 9.

According to this embodiment, since the grating 21 or 21' used in each of the aforementioned uses can be improved in the reflectance, the light of a specific wavelength or a specific wavelength band can be substantially completely reflected, so as to take out or cut the substantially entire light of the specific wavelength or the specific wavelength band.

The invention is not limited to the aforementioned embodiment but can be practiced in various other embodiments. Specifically, the metal elements to be co-doped in addition to Ge are Sn or Sn and Al in the aforementioned embodiment, but the metal elements are not limited to them, and for example, one of or two or more of metal elements such as cesium (Ce), praseodymium (Pr), terbium (Tb) and boron (B) can be co-doped in addition to Ge. Moreover, a combination of Sn and any of these metal elements can be co-doped in addition to Ge.

EXAMPLE 1

It was examined whether or not a grating could be effectively written by UV irradiation through the primary coat layer 4 of a UV transmitting resin.

Specifically, a non-coated fiber including a core 2 co-doped with Ge, Sn and Al was used to fabricate the following three samples: Sample 1 was fabricated by coating the non-coated fiber with the primary coat layer 4 of a UV transmitting resin to obtain the coated fiber 1 and writing a grating in the coated fiber 1 through UV irradiation through the primary coat layer 4; Sample 2 was fabricated by loading hydrogen at a high pressure in the core of the non-coated fiber, coating the non-coated fiber with the primary coat layer 4 of a UV transmitting resin the same as that used in the first example to obtain the coated fiber 1, and writing a grating in the coated fiber 1 through UV irradiation through the primary coat layer 4; and Sample 3 was fabricated by loading hydrogen at a high pressure (hydrogen treatment) in the core 2 of the non-coated fiber in the same manner as in the second example, and writing a grating through UV irradiation without coating the non-coated fiber with the primary coat layer 4. Each of these samples was examined for the reflectance of the grating, and the center wavelength and the wavelength width of the maximum reflective wavelength band in a reflection spectrum represented by the relationship between the wavelength and the reflectance.

Each of Samples 1, 2 and 3 will be specifically described. The non-coated fiber had a diameter of 125 $\mu$m, a mode field diameter of 6.2 $\mu$m and a cut-off wavelength of 1.28 $\mu$m, and the core of the non-coated fiber was co-doped with Ge in a concentration for attaining a relative refractive index difference $\Delta$ of approximately 0.9%, Sn in 15000 ppm and Al in 1000 ppm. In Sample 1, the non-coated fiber was coated with the primary coat layer 4 of a UV transmitting resin adjusted to have a transmission characteristic, in the vicinity of 250 nm, approximately 10 times or more as high as the transmittance of a general UV curable resin. Also, in Sample 2, the core of the non-coated fiber was loaded with hydrogen at a high pressure, and the resultant non-coated fiber was coated with the primary coat layer 4 of the same UV transmitting resin as that used in Sample 1. Furthermore, in Sample 3, the core was loaded with hydrogen at a high pressure in the same manner as in Sample 2, and the non-coated fiber was directly used without forming the primary coat layer 4. The high pressure hydrogen loading was conducted by sealing the core within a sealed vessel loaded with hydrogen at a high pressure of approximately 200 MPa for a predetermined period of time ranging between 1 week and 2 weeks.

Furthermore, the Bragg grating was written in each of Samples 1, 2 and 3 by using a UV laser source operated at 266 nm, that is, a frequency-quadrupled wavelength of YAG laser, with a pulse width of 50 ns and a repeating frequency of 10 Hz by the phase mask method using the phase mask 5 and the lens system 6 having a laser emission power of 10 mW for converging the UV (as shown in FIG. 1). Each grating 21 formed through the UV irradiation had a grating length of 10 mm.

As a result of writing the Bragg grating, the grating having a center wavelength in the vicinity of 1549 nm was formed in each of Samples 1, 2 and 3, and these gratings had reflectance and wavelength widths as listed in Table 1:

TABLE 1

| Sample | Primary coat layer | Hydrogen treatment | Grating length | Reflectance | Wavelength width |
|---|---|---|---|---|---|
| 1 | formed | not conducted | 10 mm | 8% | 0.10 nm |
| 2 | formed | conducted | 10 mm | 80% | 0.12 nm |
| 3 | not formed | conducted | 10 mm | 99% | 0.15 nm |

As shown in Table 1, in Samples 1 and 2, which are examples of the invention where the UV laser beam is irradiated through the primary coat layer 4, the wavelength widths are 0.10 nm and 0.12 nm, respectively. Therefore, regardless of the hydrogen treatment (high pressure hydrogen loading), the wavelength widths are not enlarged in Samples 1 and 2 as compared with that of Sample 3, namely, 0.15 nm, where the non-coated fiber without bearing the primary coat layer 4 was irradiated with the UV laser beam. Accordingly, it is understood that the grating is effectively written in the core 2 even when the UV laser beam is irradiated through the primary coat layer 4. In particular, in Sample 1which was not subjected to the hydrogen treatment, although the reflectance of 8% is slightly poor, it is understood that the grating is effectively written by the UV irradiation through the primary coat layer 4. The reflectance of Sample 1 was as low as 8% probably because the time of the UV laser irradiation was comparatively short.

Moreover, each of Samples 1 and 2 was coated with the secondary coat layer 7 of a resin having a predetermined negative coefficient of linear expansion, so as to examine the strain and the change (shift) of the center wavelength of the maximum reflective wavelength band caused by changing the temperature by 10° C. at a time between −20° C. and +100° C. In a specific test method, a coated fiber 1' with an effective length of 100 m was housed in a thermostatic chamber, and light modulated in the frequency by a modulation frequency of 500 MHz was input to the input end so as to measure the phase of output light emitted from the output end. The strain was obtained based on the phase difference between the input light and the output light.

Figure 7:
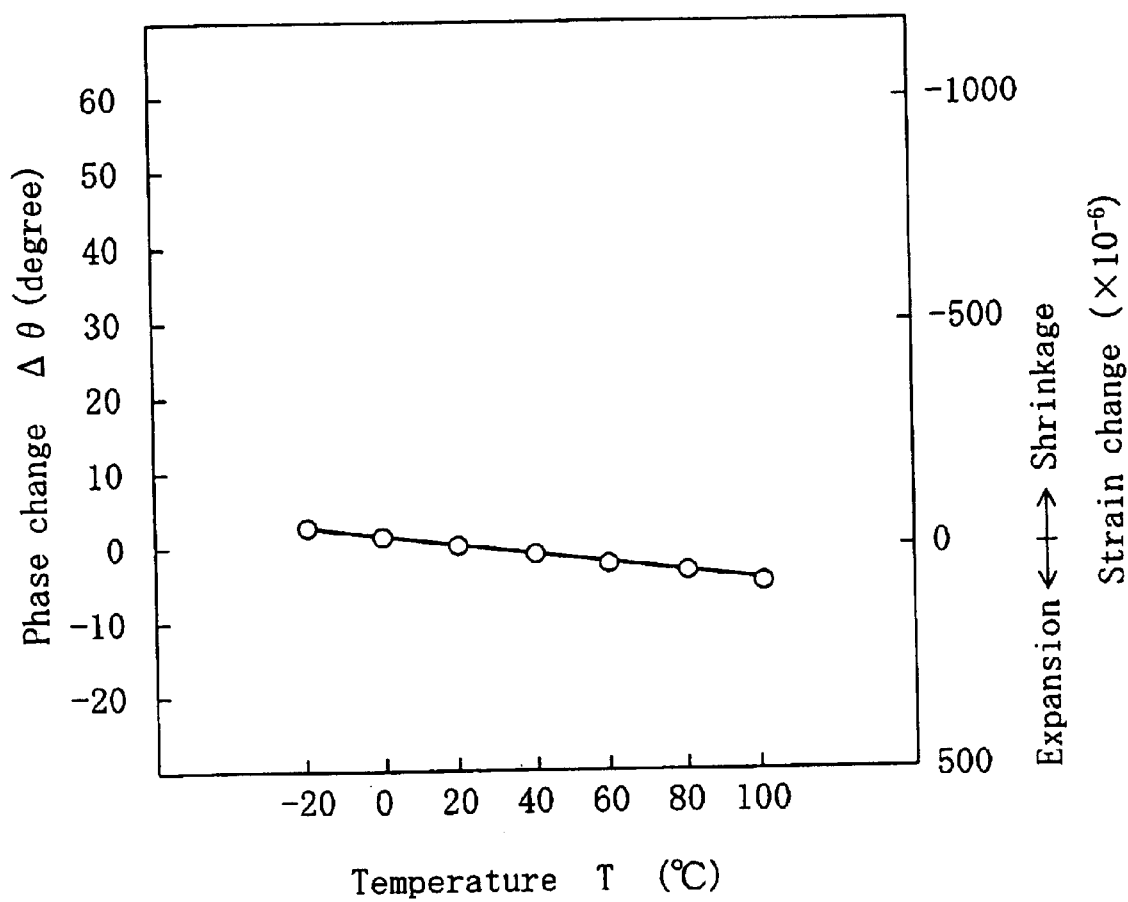
FIG. 7 is a diagram for showing the characteristics of strain change and phase change against temperature change.

As a result, as is shown in FIG. 7, even when the temperature was changed in the range between −20° C. and +100° C., the coefficient of linear expansion was changed merely by 1 ppm/° C., and the shift of the center wavelength in accordance with the temperature change could be suppressed to be very small.

Figure 8:
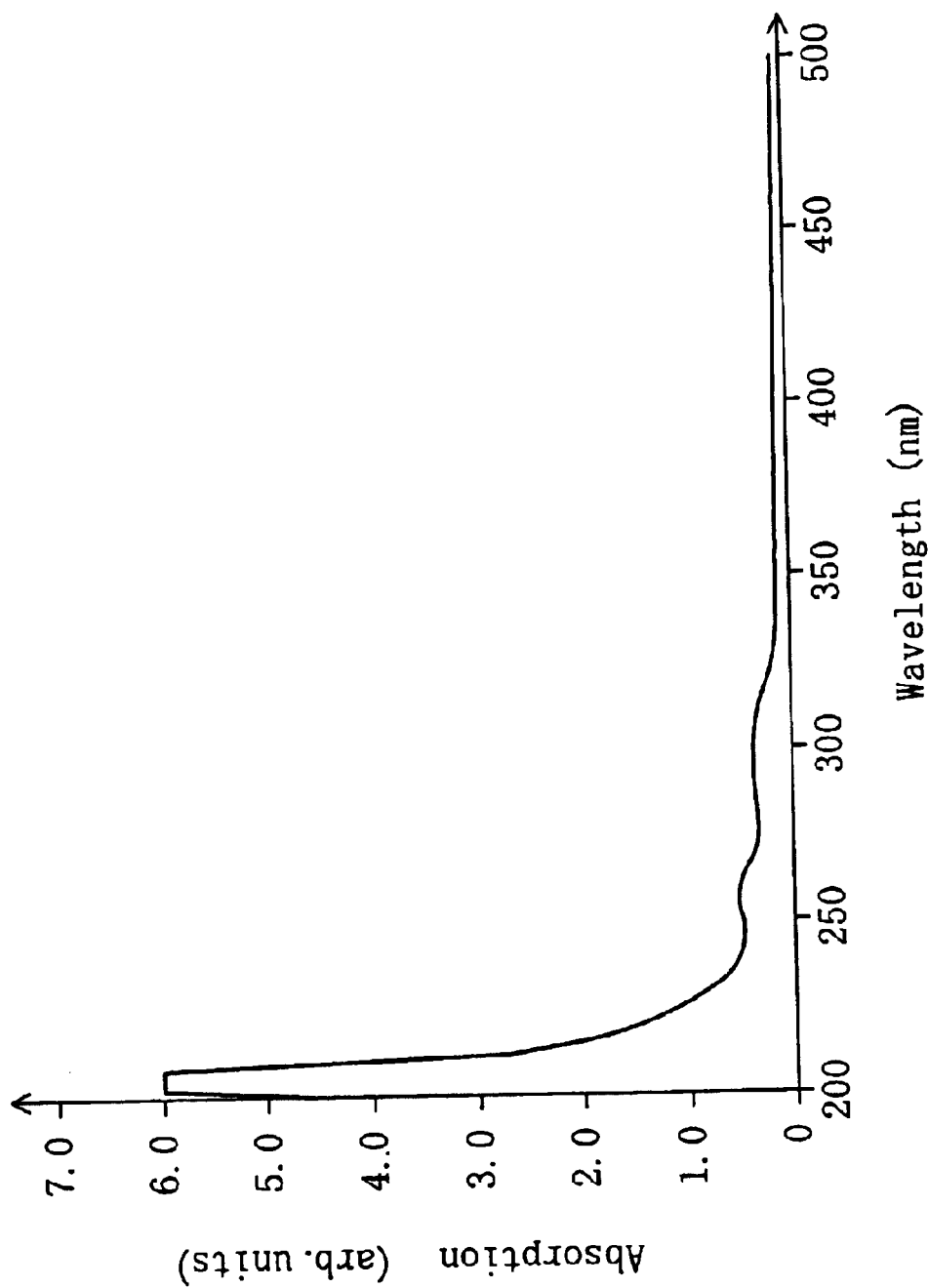
FIG. 8 is a diagram for showing the characteristic of absorption against a wavelength.

The transmission characteristic measured in the UV transmitting resin used for forming the primary coat layer 7 of Samples 1 and 2 is shown in FIG. 8. This is absorption of the UV transmitting resin in a thickness of 20 μm against light of respective wavelengths. As is shown with a solid line in FIG. 8, the absorption is very small in the wavelength band of 240 nm through 270 nm, which is used in writing the grating, while UV of the wavelength band shorter than 240 nm is sufficiently absorbed so as to accelerate the curing reaction.

TEST EXAMPLE

It was confirmed that the reflectance is increased by co-doping Sn or the like in addition to Ge in a general concentration.

Specifically, the following samples were fabricated so as to compare their performance in the reflectance: In Sample 4, that is, an example of the invention, the grating was written in a core co-doped with Ge in a concentration of the general specifications and Sn; in Sample 5, the grating was written in a core doped with Ge alone in a concentration of the general specifications; and in Sample 6, the grating was written in a core doped with Ge alone in a higher concentration than in the general specifications.

Now, Samples 4, 5 and 6 will be specifically described. In each sample, the non-coated fiber had an outer diameter of 125 μm, a mode field diameter of 6 μm and a cut-off wavelength of approximately 1.3 μm. In Sample 4, the core was co-doped with Ge in a concentration for attaining the relative refractive index difference Δ of 0.9% and Sn in a concentration of 10000 ppm, so as to attain the relative refractive index difference Δ of 1.0%. In Sample 5, the core was doped with Ge alone in a concentration for attaining a relative refractive index difference Δ of approximately 0.9%, and in Sample 6, the core was doped with Ge alone in a concentration for attaining a relative refractive index difference Δ of approximately 2.0%.

Furthermore, with respect to each type of cores of the samples, two kinds were prepared, one of which was loaded with hydrogen at a high pressure and the other was not loaded with hydrogen (without the hydrogen treatment), so as to compare the core obtained without the hydrogen treatment and the core loaded with hydrogen. Accordingly, Samples 4, 5 and 6 without the hydrogen treatment are respectively designated as E-1, N-1 and H-1, and Samples 4, 5 and 6 loaded with hydrogen at a high pressure are respectively designated as E-2, N-2 and H-2. The high pressure hydrogen loading was conducted by sealing the core in a sealed vessel loaded with hydrogen at a high pressure of approximately 200 MPa for a predetermined period of time in a range between 1 week and 2 weeks.

The grating was written in the non-coated fiber of each of Samples E-1,2, N-1,2 and H-1,2, similarly to the first test example, by using a UV laser source operated at 266 nm, that is, a frequency-quadrupled wavelength of the YAG laser, with a pulse width of 50 ns and a repeating frequency of 10 Hz, by the phase mask method using the phase mask 5 and the lens system 6 having the laser emission power of 10 mW for converging the UV, with variously changing the irradiation time (as shown in FIG. 1). At this point, a grating with a grating length of 0.3 mm was formed in each of Samples E-1, N-1 and H-1, and a grating with a grating length of 2.0 mm was formed in each of Samples E-2, N-2 and H-2.

Figure 9:
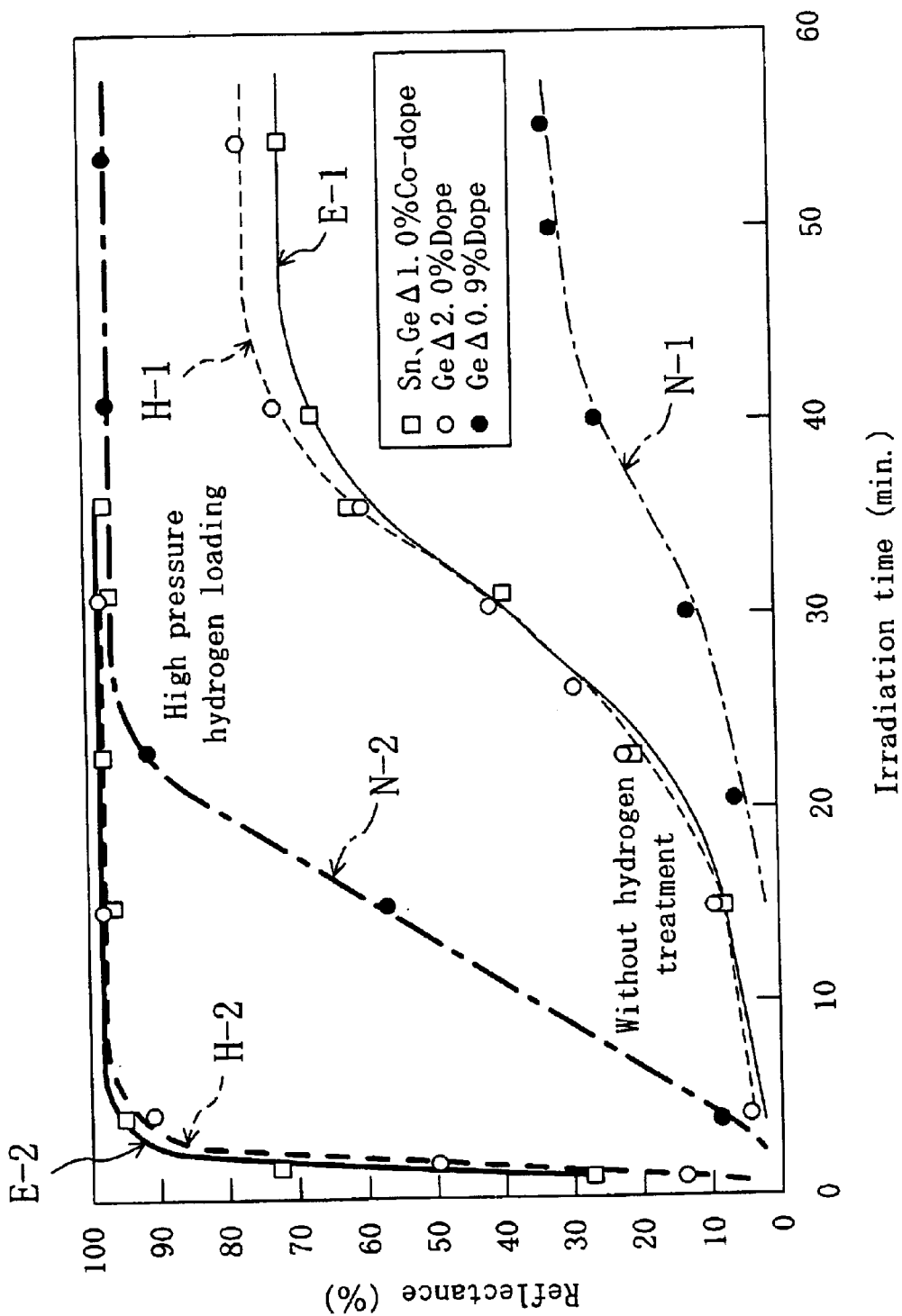
FIG. 9 is a diagram for showing the reflectance characteristics of various fiber gratings against UV irradiation time.

The reflectance characteristics against the UV irradiation time of the six kinds of Samples E-1, N-1, H-1, E-2, N-2 and H-2, which are different from one another in the three kinds of dopes and in the high pressure hydrogen loading are shown in FIG. 9.

On the basis of FIG. 9, the samples obtained without the hydrogen treatment are compared as follows: In Sample E-1 that was co-doped with Sn in addition to Ge, the reflectance increased as the irradiation time increased, and reflectance of approximately 70% was attained when the irradiation time was 40 through 50 minutes. In Sample N-1 that was doped with Ge alone in the general concentration, although the reflectance increased as the irradiation time increased, reflectance of merely approximately 30% was attained when the irradiation time was 40 through 50 minutes. In Sample H-1 that was doped with Ge alone in a high concentration, the reflectance increased as the irradiation time increased, and reflectance of approximately 75% was attained when the irradiation time was 40 through 50 minutes.

Accordingly, in Sample E-1, the reflectance can be increased without the high pressure hydrogen loading by co-doping Sn in addition to Ge in the general concentration as compared with Sample N-1 doped with Ge alone in the general concentration, and in addition, Sample E-1 attains high reflectance substantially equivalent to that of Sample H-1 doped with Ge in a high concentration for attaining the relative refractive index difference of 2.0%.

Furthermore, the samples obtained by conducting the high pressure hydrogen loading are compared as follows: In Sample E-2, the reflectance rapidly increased, immediately after the start of the irradiation, to 95% or more in the irradiation time of several minutes. In contrast, in Sample N-2 that was doped with Ge alone in the general concentration, although the reflectance increased as the irradiation time increased, the reflectance of approximately 95% could not be attained until the irradiation time of 30 minutes or more elapsed, and in Sample H-2 that was doped with Ge alone in a high concentration, the reflectance increased substantially similarly to that of Sample E-2 although it was slightly lower than that of Sample E-2.

Accordingly, also when the high pressure hydrogen loading is conducted, in Sample E-2, high reflectance substantially equivalent to that of Sample H-2 doped with Ge in a high concentration can be attained by co-doping Sn in addition to Ge in the general concentration, and in addition, high reflectance of 95% or more can be attained through UV irradiation for a very short period of time as compared with in Sample N-2 doped with Ge alone in the general concentration.

Also when the concentration of Sn to be co-doped in each of Samples E-1 and E-2 was increased from 10000 ppm to 15000 ppm, the effect of attaining high reflectance was substantially similarly exhibited.

As described above, according to the fiber grating of this invention, since the coat layer covering the core and the cladding is formed from a UV transmitting resin, a grating can be effectively written in the core by UV irradiation through the coat layer because the UV transmits the coat layer so as to effectively irradiate the core. Accordingly, the grating can be written without removing the coat layer, and hence, degradation of the transmitting characteristic accompanied by the removal of the coat layer can be avoided, and in addition, the process for removing the coat layer can be omitted, so as to ease the fabrication of the fiber grating.

When the photo-induced refractive index change of the core is stationarily increased by co-doping Sn as compared with a core doped with Ge alone in the general concentration, the formed grating can attain higher reflectance than that attained by using the core doped with Ge alone in the general concentration. Moreover, when the concentration of the doped Ge is set to the same concentration as in the core of an optical fiber to be connected, the connection loss can be prevented from increasing even when the fiber grating is connected to the optical fiber with the general specifications.

Furthermore, without conducting the high pressure hydrogen loading, the reflectance can be stationarily increased by co-doping the core with Ge and Sn, and hence, the time restriction as in forming a grating required when the high pressure hydrogen loading is employed can be avoided.

When the secondary coat layer is formed, the stability against the temperature change can be improved, which leads to stability in the mechanical strength characteristic. As a result, the shift of the reflective wavelength derived from expansion/shrinkage of the fiber can be prevented and suppressed, and the same reflecting function can be definitely retained, resulting in improving the reliability.

Embodiment 2

A fiber grating of this embodiment basically has the same structure as that shown in FIG. 1. A coat layer 4 of this embodiment, however, is characterized by being formed in a thickness of at least approximately 30 $\mu$m by single coating subsequently to a process for drawing a non-coated fiber 1'. As the material for the coat layer 4, a UV transmitting resin having the characteristic of transmitting UV as described above is used.

Also in this embodiment, a grating 21 is written in a core 2 through UV irradiation from the outside of a coated fiber 1, namely, through the coat layer 4. The grating 21 may be written by any of various known methods. When the grating 21 is written by the phase mask method, a phase mask 5 in the shape of a grating is disposed on the immediate side of the coated fiber 1 as shown in an exemplified fabrication apparatus of FIG. 10. Then, the phase mask 5 is irradiated by using a Nd-YAG laser source 6, that is, solid laser, with a coherent UV laser beam having a frequency-quadrupled wavelength (4ω), i.e., 266 nm, converged by a cylindrical lens system 7. Thus, the UV laser beam transmits the phase mask 5 and the coat layer 4, so as to write the grating 21 in the core 2 by increasing the refractive index of a portion of its grating pitch corresponding to the grating pitch of the phase mask 5. In using the solid laser, a laser beam with higher spatially coherency can be obtained than in using gas laser. When the spatially coherency is higher, a pattern can be accurately transferred even when a distance between the phase mask 5 and the core 2 is large. In the case where the core 2 covered with the coat layer 4 is irradiated with laser as in this invention, the distance between the core 2 and the phase mask 5 is increased by the thickness of the coat layer 4, and hence, the use of the solid laser leads to a very preferable effect. Since the solid laser has smaller output light intensity than gas laser such as KrF, the laser beam is preferably converged by using a lens system such as the cylindrical lens system 7 described above.

Figure 10:
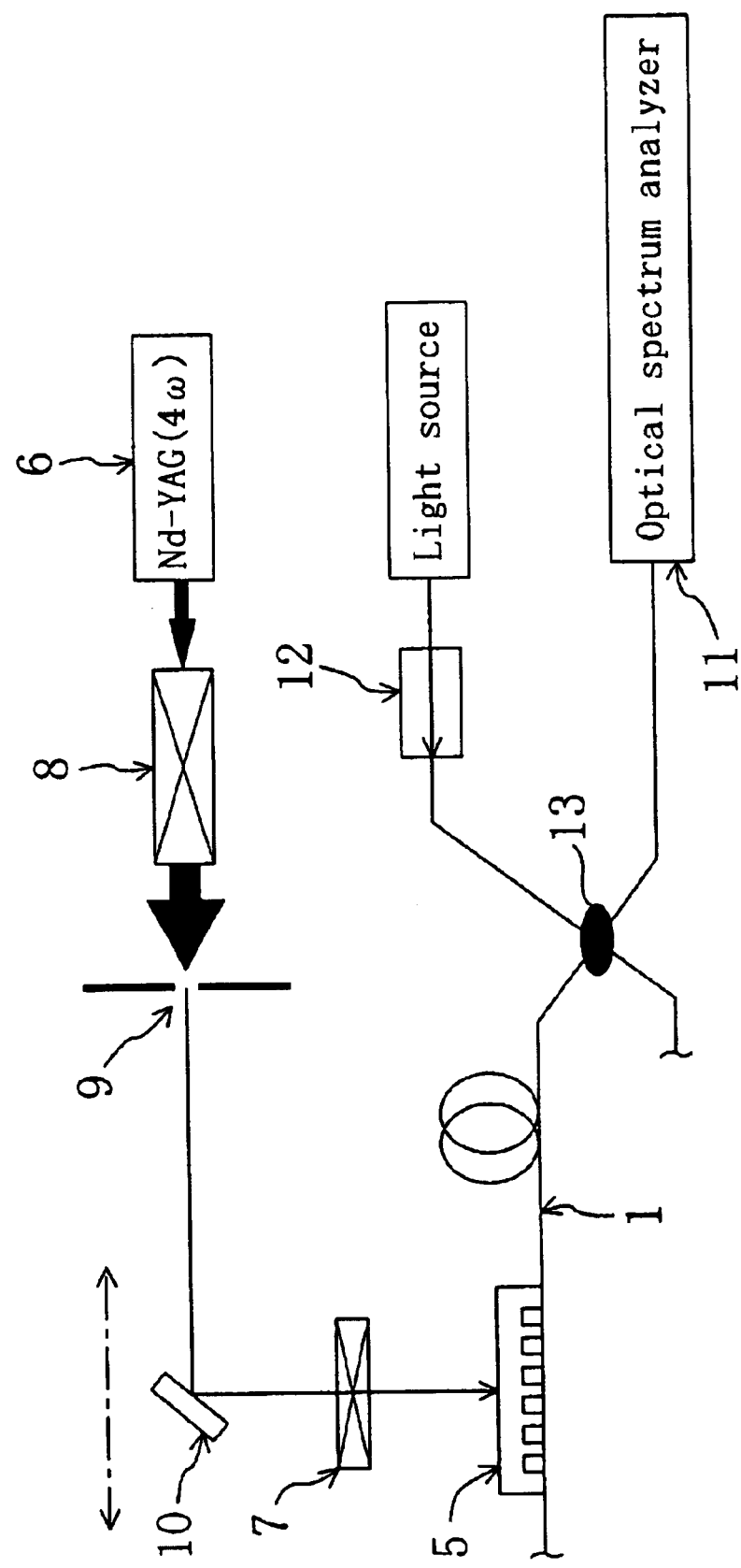
FIG. 10 is a schematic diagram of a fabrication apparatus.

In FIG. 10, a reference numeral "8" denotes a beam expander for expanding the UV laser beam into a parallel beam, and a reference numeral "9" denotes a slit with a small width for taking out a portion with uniform power of the UV laser beam having been changed into the parallel beam. A reference numeral "10" denotes a movable reflective mirror movable along the lengthwise direction (shown with a dashed line) of the coated fiber 1, a reference numeral "11" denotes an optical spectrum analyzer, a reference numeral "12" denotes an optical isolator and a reference numeral "13" denotes an optical coupler.

Now, a method of writing a grating according to this embodiment will be described in detail.

In this embodiment, the UV laser beam irradiation is conducted at an irradiation energy density of approximately 1.5 through 4.0 kJ/cm$^2$. Thus, in conducting the UV laser beam irradiation through the coat layer 4, even when the coat layer 4 has a thickness of approximately 30 $\mu$m or more, large refractive index modulation can be caused in the core 2 through the coat layer 4, so as to write the grating 21 having high reflectance.

Figure 11:
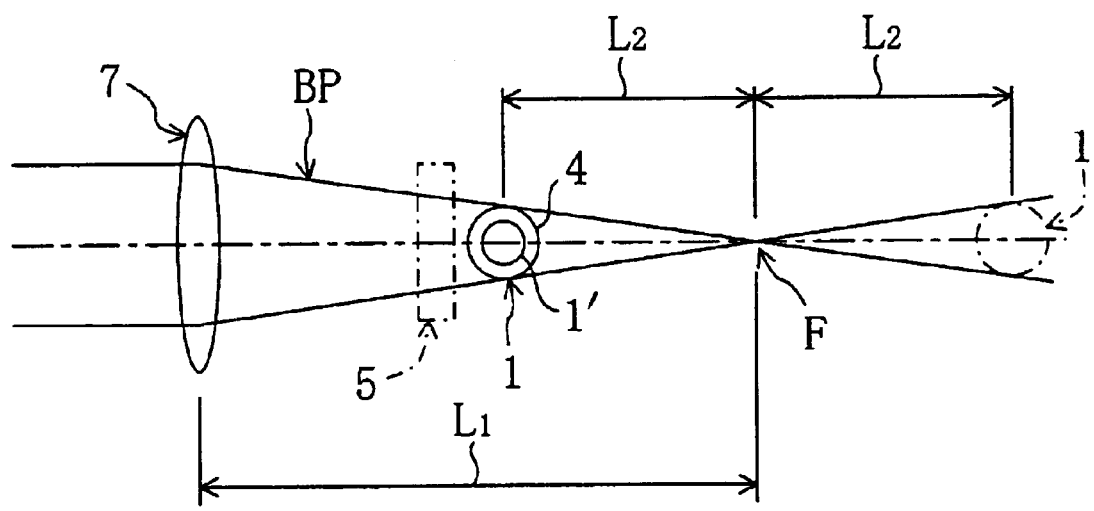
FIG. 11 is a diagram for showing the positional relationship between a coated fiber and a cylindrical lens system.

In addition, the UV laser beam irradiation is conducted with the coated fiber 1, that is, the target for writing, placed in a specific position relative to a beam pattern BP of the UV laser beam converged by the cylindrical lens system 7 as shown in FIG. 11. The beam pattern BP is formed by the parallel beam having passed through the cylindrical lens system 7 and converged toward a focal point F. The coated fiber 1 is positioned so that the entire coated fiber 1 can be disposed within the beam pattern BP and that the outer face of the coat layer 4 of the coated fiber 1 can be internally in contact with the outer edge of the beam pattern BP. As far as this positional relationship is satisfied, the coated fiber 1 can be disposed in front of the focal point F as is shown with a solid line in FIG. 11 or behind the focal point F as is shown with a dashed line in FIG. 11. For example, when the focal distance L1 is 100 mm, a coated fiber 1 with an outer diameter of 200 $\mu$m may be disposed on the optical axis away from the focal point F by a distance L2 corresponding to approximately 2 mm. When the entire coated fiber 1 is thus disposed within the beam pattern BP, the entire coat layer 4 can be irradiated with the UV laser beam at a uniform irradiation energy density. Moreover, local damage (strength degradation), which can be occasionally caused when the coated fiber 1 is disposed closer to the focal point F, can be prevented, and the irradiation can be conducted with the coated fiber 1 placed in a position for attaining the highest irradiation energy density within a range where the strength degradation can be avoided, resulting in shortening the time required for writing the grating.

EXAMPLE 2

A fiber grating fabricated by the method of the above-described embodiment was examined for the transmitting characteristic and the mechanical strength characteristic. With respect to the transmitting characteristic, the reflectance against light of a specific wavelength, the full width half maximum and the side lobe, and with respect to the mechanical strength characteristic, the stress corrosion susceptibility parameter and the failure strength of the fiber grating and change of the Young's modulus of the coat layer 4 were measured and tested.

Specimen (Specifications of Specimen)

The specifications of a coated fiber 1 used in the test are listed in Table 2.

TABLE 2

| Relative refractive index difference Δ (%) | 0.97 |
|---|---|
| Sn concentration (ppm) | 15000 |
| Al concentration (ppm) | 900 |
| Mode field diameter ($\mu$m) | 5.55 |
| Cut-off wavelength (nm) | 1270 |
| Diameter of cladding ($\mu$m) | 125 |
| Outer diameter of coat layer ($\mu$m) | 200 |

Figure 12:
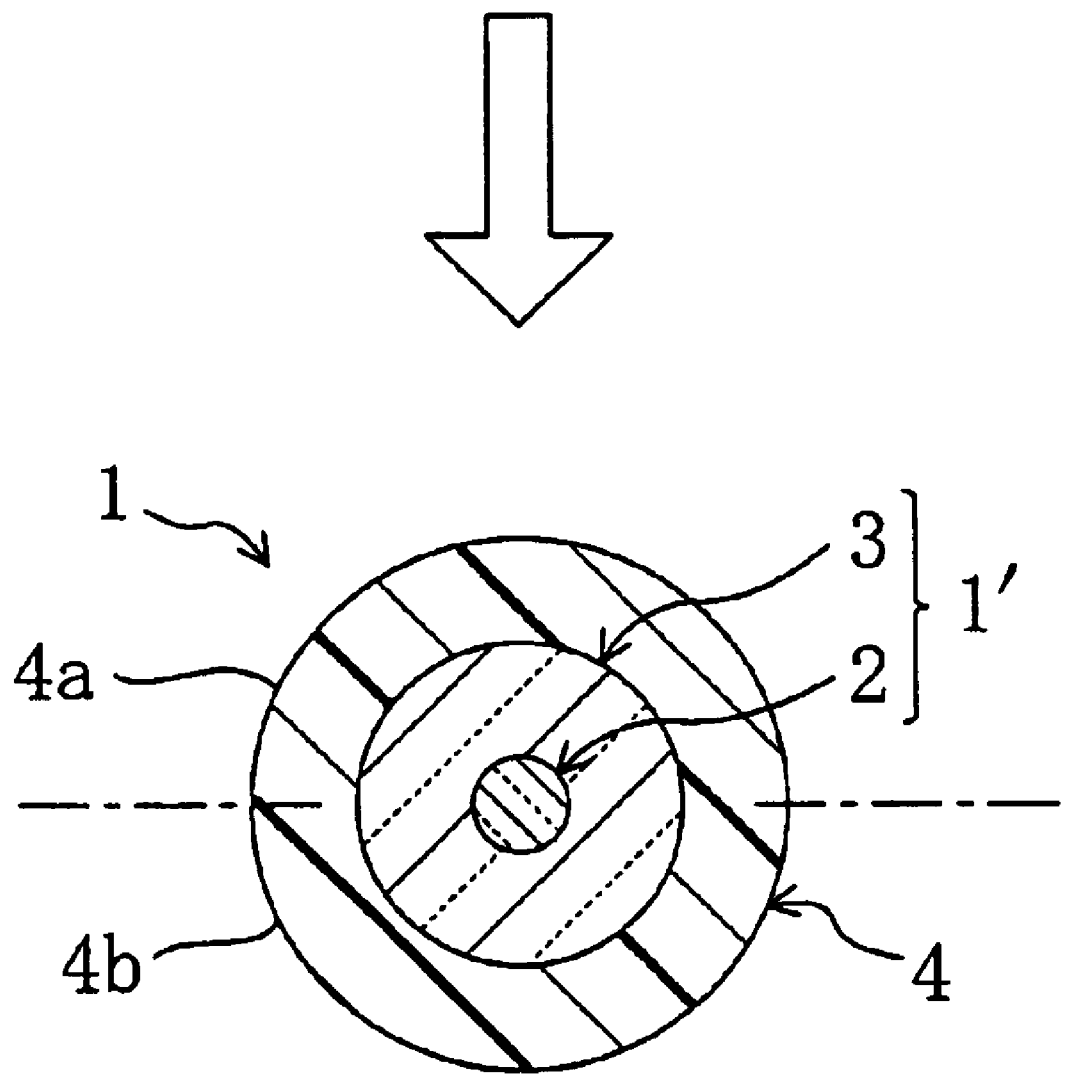
FIG. 12 is an enlarged horizontal sectional view of the coated fiber.

A core glass co-doped with Ge in the general concentration, Sn in a concentration of 15000 ppm and Al in a concentration of 900ppm was prepared by using both VAD and solution-doping technique, and a fiber base material obtained by collapsing a cladding glass was drawn around the core glass, so as to obtain a non-coated fiber 1' (see FIG. 12). Subsequently, the non-coated fiber 1'was covered by single coating with a coat layer 4 with a thickness of 37.5 $\mu$m of a UV transmitting type UV curable resin, thereby obtaining a coated fiber 1. The coated fiber 1 has a relative refractive index difference Δ of 0.97%, a mode field diameter of 5.55 $\mu$m, a cut-off wavelength of 1270 nm, a diameter of the cladding (the outer diameter of the non-coated fiber 1') of 125 $\mu$m, and an outer diameter of the coat layer (the outer diameter of the coated fiber 1) of 200 $\mu$m. The coated fiber 1 was sealed within a sealed vessel loaded with hydrogen at a high pressure of 20 MP a for approximately 2 weeks for conducting the high pressure hydrogen loading in the coated fiber 1.

(Test for Reflection Characteristic Attained by Co-doping Sn)

It was confirmed through increase of the reflectance of a written grating that the photo-induced refractive index change is increased by co-doping the core 2 with Sn in addition to Ge in the general concentration. Also, difference in the reflectance caused by the high pressure hydrogen loading conducted in the core 2 was also confirmed. In this test, the grating was written through UV laser beam irradiation with the coat layer 4 removed.

The following samples were fabricated so as to compare the reflection performance thereof: Sample E-1 was obtained by co-doping the core 2 with Ge in the general concentration (for attaining a relative refractive index difference Δ of the non-coated fiber of approximately 0.9%) and Sn in 10000 ppm; Sample E-2 was obtained by conducting the high pressure hydrogen loading in the core the same as that used in Sample E-1; Sample N-1 was obtained by doping the core 2 with Ge alone in the general concentration; Sample N-2 was obtained by conducting the high pressure hydrogen loading in the core the same as that used in Sample N-1; Sample H-1 was obtained by doping the core 2 with Ge in a higher concentration than in the general specifications (for attaining a relative refractive index difference Δ of approximately 2.0%); and Sample H-2 was obtained by conducting the high pressure hydrogen loading in the core the same as that used in Sample H-1.

The reflection characteristics of six Samples E-1, N-1, H-1, E-2, N-2 and H-2 against the UV irradiation time are shown in FIG. 9.

(Test for Light Absorbance Characteristic of Coat Layer Material)

The change of light absorbance of the resin used for forming the coat layer 4 against the UV irradiation energy density was confirmed. A sheet with a thickness of 60 $\mu$m was formed from the same material as the aforementioned resin, and the sheet was irradiated with UV under the same irradiation conditions with merely the irradiation energy density (unit: kJ/cm$^2$) changed between "0", "1.5" and "9.0", so as to measure the change of the light absorbance against the wavelength. The results are shown in FIG. 13.

Figure 13:
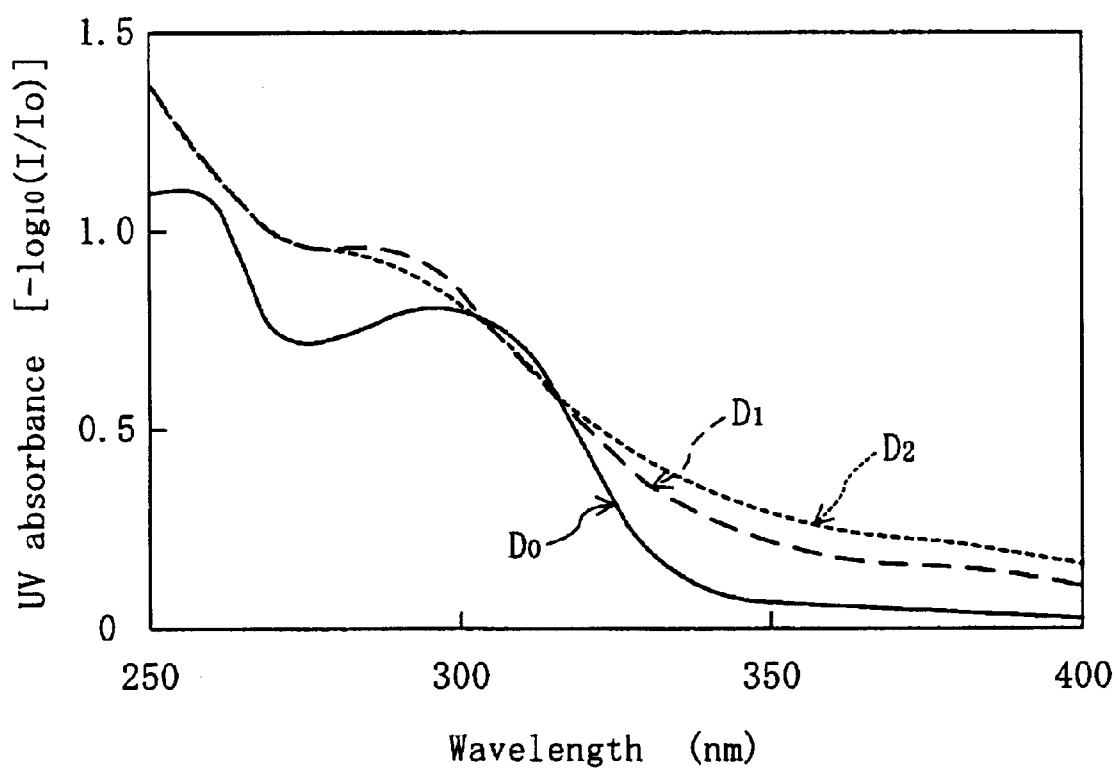
FIG. 13 is a diagram for showing the dependence of UV absorbance on an irradiation energy density.

In FIG. 13, D0 indicates the light absorbance obtained when the irradiation energy density is "0", namely, without irradiating with UV, D1 indicates that obtained when the irradiation energy density is "1.5", and D2 indicates that obtained when the irradiation energy density is "9.0".

As shown in FIG. 13, in the range of the wavelength between 250 and 300 nm, the light absorbance D0, D1 and D2 are all in the vicinity of 1.0, and even when the irradiation energy density is "1.5" as in the case of D1 and as high as "9.0" as in the case of D2, the light absorbance is satisfactorily as low as 1 or less at the wavelength of approximately 270 nm. Accordingly, even when the UV laser beam of a wavelength of 266 nm irradiates through the coat layer 4 as described below, the UV laser beam transmits the coat layer 4 without attenuating the optical incident energy so that the core 2 can be irradiated with the UV laser beam.

Specifications of Fabrication Apparatus

As the UV light source, a Nd-YAG laser source 6 (as shown in FIG. 10) having the maximum average power of 100 mW, a pulse width of 50 ns and a pulse frequency of 10 Hz was used. The coated fiber 1 was irradiated with the UV laser beam of 266 nm, that is, the frequency-quadrupled wavelength of the Nd-YAG laser, at the irradiation energy density on the coat layer 4 of 1.5 kJ/cm$^2$. At this point, the coated fiber 1 was placed in a position so that the outer face of the coat layer 4 could be internally in contact with the beam pattern BP as shown in FIG. 11. Under this condition, the average power of the incident beam on the phase mask 7 was 10 mW, and the dimension of the UV beam irradiating the coated fiber 1 having the outer diameter of 200 $\mu$m was approximately 2 mm (along the fiber axial direction) x approximately 0.2 mm (along the fiber radial direction). The phase mask 7 had a grating pitch of 1065 nm and a length of 25 mm. The movable mirror 10 was smoothly and continuously moved along the fiber axial direction (lengthwise direction), so as to write the grating 21 with a length of 24 mm along the axial direction.

Transmitting Characteristic

Figure 14:
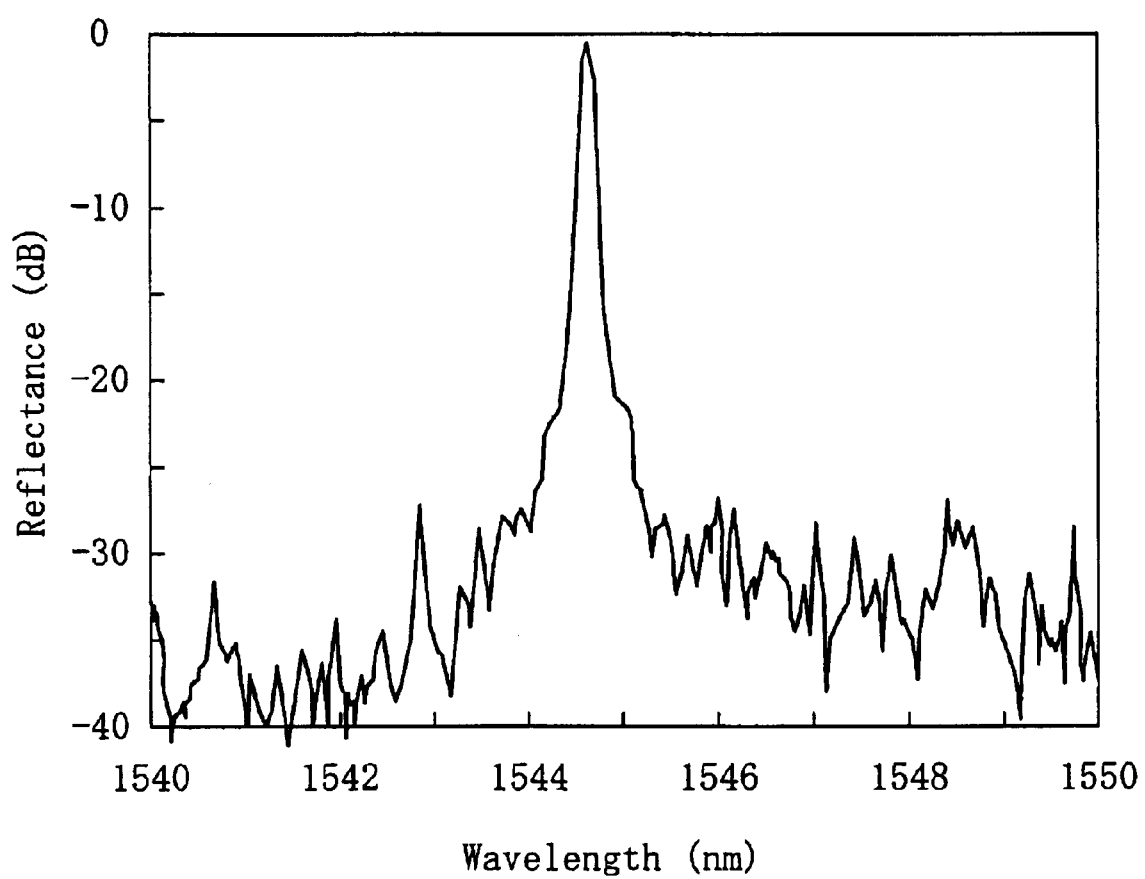
FIG. 14 is a diagram of a reflection spectrum of the fiber grating.

The reflection spectrum of the thus fabricated fiber grating was measured. The result is shown in FIG. 14. As shown in FIG. 14, the maximum reflectance is 99% or more at the center wavelength of 1544.6 nm, the full width half maximum (FWHM) is 0.14 nm, and the side lobe is suppressed by 25 dB or more in the center wavelength region. Thus, a good transmitting characteristic is realized.

Mechanical Strength Characteristic (Failure Strength)

Figure 15:
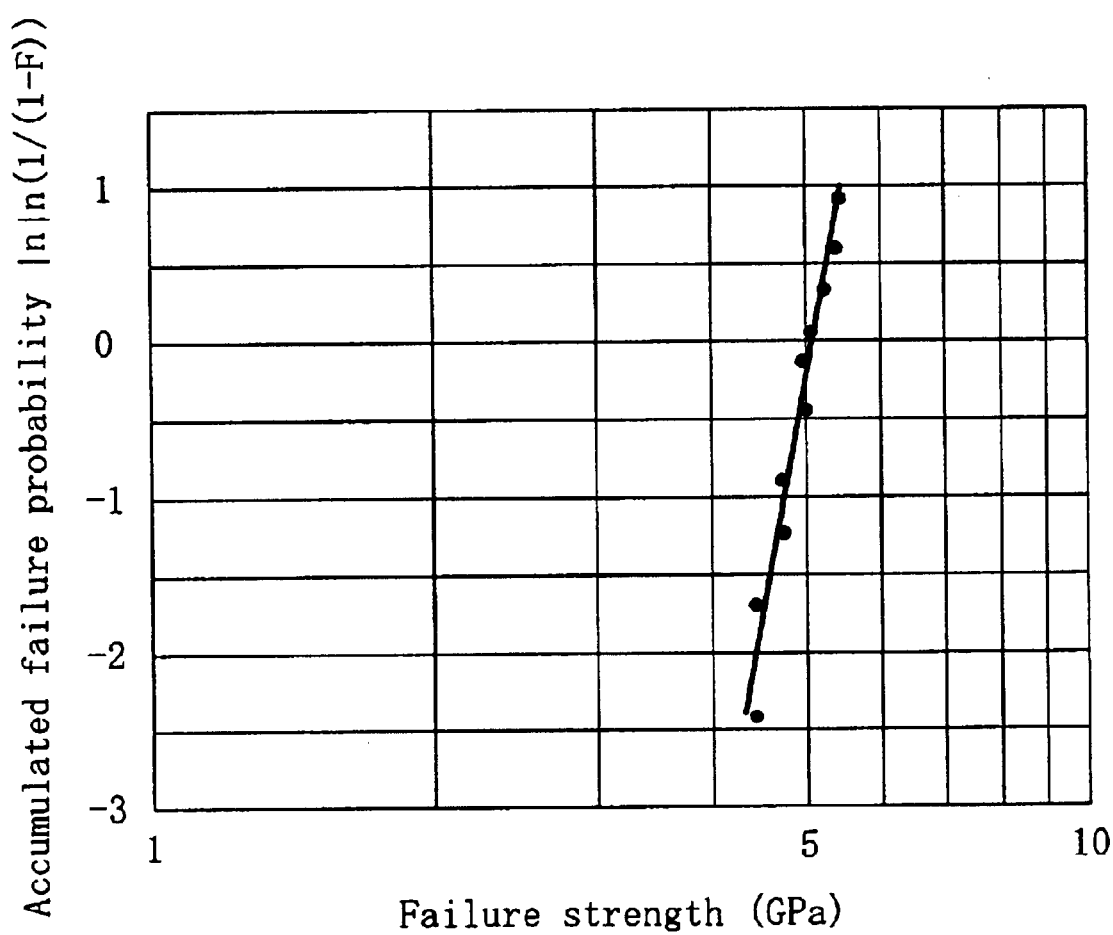
FIG. 15 is a diagram of a Weibull distribution of failure strength of the fiber grating.

A large number of fiber gratings fabricated under the same conditions were measured for the failure strength. A Weibull distribution obtained as a result is shown in FIG. 15. The temperature and the humidity of the test room during the measurement were controlled to be 22° C. and 50% RH, respectively. The measurement was conducted under tension conditions of a gauge length of 100 mm and a tension rate of 100 mm/min.

As shown in FIG. 15, the maximum value of the failure strength is 5.42 GPa, the minimum value is 4.40 GPa, and the average value is 4.90 GPa, which are substantially equivalent to the failure strength of a general communication coated fiber to be connected to the fiber grating.

(Stress Corrosion Susceptibility Parameter)

With respect to specimens obtained before and after forming the grating 21, namely, before and after the UV laser beam irradiation, a stress corrosion susceptibility parameter (value) was obtained through evaluation of the dynamic fatigue characteristic by changing the tension rate in measurement of the failure strength between three levels.

As a result, the stress corrosion susceptibility parameter before forming the grating was found to be 23 and that after forming the grating was found to be 20 as shown in Table 3.

TABLE 3

|  | Stress corrosion susceptibility parameter |
| --- | --- |
| Before forming grating | 23 |
| After forming grating | 20 |

Although the formation of the grating slightly degrades the stress corrosion susceptibility parameter from 23 to 20 and slightly shortens the time period before braking, the stress corrosion susceptibility parameter after forming the grating is still sufficient for practical use. The stress corrosion susceptibility parameter of a general communication coated fiber to be connected to the fiber grating is approximately 23 through 24.

(Change of Young's Modulus of Coat Layer 4)

Change of the Young's modulus of the coat layer 4 was measured against the irradiation energy density (unit: kJ/cm$^2$) changed between "0", "3.0" and "7.5" by respectively setting the irradiation time to 0 minute, 20 minutes and 50 minutes. Specifically, in a specimen obtained by fabricating the fiber grating under each condition, the coat layer 4 in the portion irradiated with the UV laser beam was cut along the fiber axial direction into two, namely, a front side piece facing the irradiation and a back side piece. Thus, an irradiation front coat piece 4$a$ (see FIG. 12) and an irradiation back coat piece 4$b$ each in a semi-cylindrical shape were obtained as samples. Each of these coat pieces 4$a$ and 4$b$ was pulled along the fiber axial direction with a gauge length of 15 mm at a tension rate of 1 mm/min., so as to obtain the Young's modulus based on the tensile force applied for attaining expansion of 2.5%. The results are shown in Table 4.

TABLE 4

| Irradiation time (min) | | 0 | 20 | 50 |
| --- | --- | --- | --- | --- |
| Irradiation energy density (kJ/cm$^2$) | | 0 | 3.0 | 7.5 |
| Young's modulus | Front side | 459 | 540 | 601 |
| (MPa) | Back side | 459 | 533 | 540 |

As shown in Table 4, the Young s modulus of the irradiation front coat piece 4$a$, which was 459 MPa before the UV laser beam irradiation, increased to 540 MPa through the irradiation at an irradiation energy density of 3.0 kJ/cm$^2$ and to 601 MPa through the irradiation at an irradiation energy density of 7.5 kJ/cm$^2$, and thus, it increased by 17.7% and 30.9%, respectively. On the other hand, the Young's modulus of the irradiation back coat piece 4$b$, which was 459 MP a before the UV laser beam irradiation, increased to 533 MPa through the irradiation at an irradiation energy density of 3.0 kJ/cm$^2$ and to 540 MPa through the irradiation at an irradiation energy density of 7.5 kJ/cm$^2$, and thus, it increased merely by 16.1% and 17.7%, respectively. Accordingly, the degree of increase of the Young's modulus of the coat layer 4 depends upon the irradiation energy density, and as the irradiation energy density increases with time of irradiation, the Young's modulus increases. In addition, the Young's modulus more largely increases in the front portion of the coat layer 4 where the irradiation energy density is higher.

At this point, when the Young's modulus of the coat layer 4 excessively increases, it becomes so hard that the flexibility of the coated fiber 1 is spoiled. As the coat layer 4 becomes harder, the coat layer 4 becomes more fragile and the strength characteristic becomes poorer. It is considered in general that the increase of the Young's modulus of the coat layer 4 within a range of 20% will not cause any problem in practical use as a coated fiber on the safest assumption. Therefore, when the irradiation energy density of the above-described example is approximately 1.5 kJ/cm$^2$, the increase of the Young's modulus of the coat layer 4 causes no problem for sufficiently keeping the flexibility and exhibiting a good strength characteristic. Moreover, even when the irradiation energy density is 3.0 kJ/cm$^2$, the increase of the Young's modulus is 17.7% in the front portion, where the largest change occurs, and sufficient flexibility and strength characteristic can be still attained. In particular, as the irradiation energy density is higher, higher refractive index modulation can be caused, resulting in forming a grating with higher reflectance. Therefore, even when the thickness of the coat layer 4 is thicker than that of the example, i.e., 37.5 $\mu$m, a fiber grating having both a good transmitting characteristic and a higher mechanical strength characteristic can be fabricated. With respect to the irradiation front coat piece 4$a$, the irradiation energy density corresponding to the increase of the Young' s modulus of 20%, that is, the safest standard, obtained based on Table 3 by proportional distribution is 3.8 kJ/cm$^2$. Accordingly, from the viewpoint of the flexibility of the coat layer 4, it seems that the irradiation can be conducted at an irradiation energy density up to approximately 4.0 kJ/cm$^2$.

(Surface Property of Coat Layer 4)

The coated fiber 1 was positioned as shown in FIG. 11 and irradiated with the UV laser beam at an irradiation energy density of 1.5 kJ/cm$^2$, so as to visually observe the surface property of the coat layer 4. As a result, the surface was found to be in a good condition having neither yellowing nor damage.

Temperature Characteristic and Tension Characteristic of Fiber Grating (Temperature Characteristic)

Figure 16:
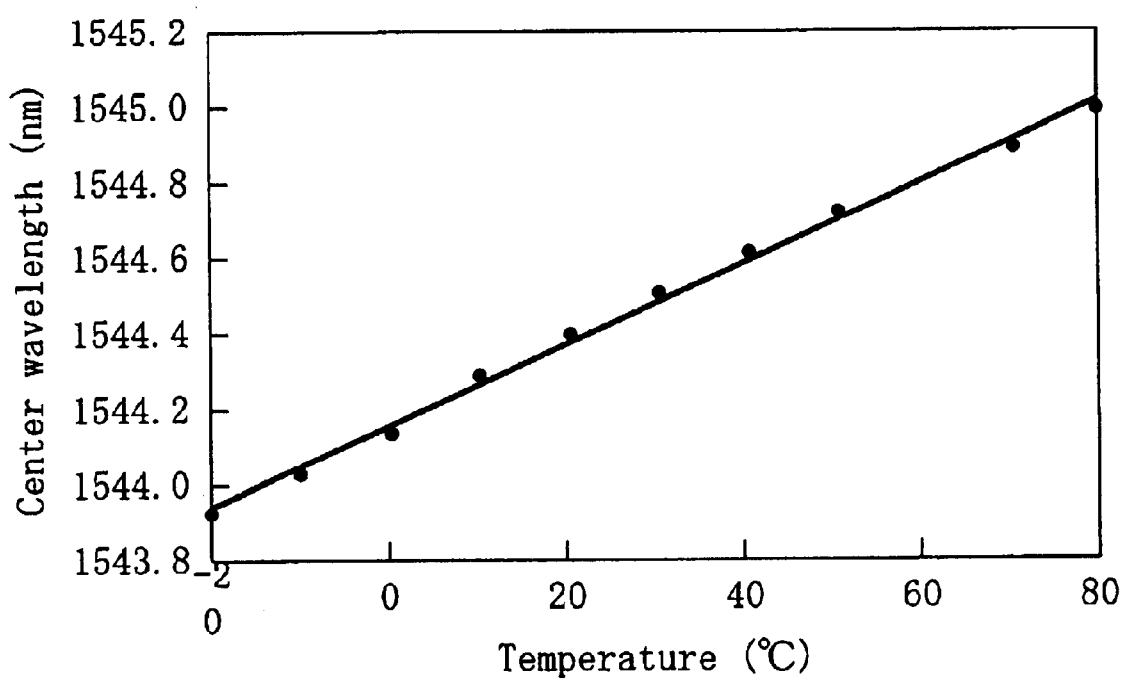
FIG. 16 is a diagram for showing the temperature characteristic of a center wavelength of the fiber grating.
Figure 17:
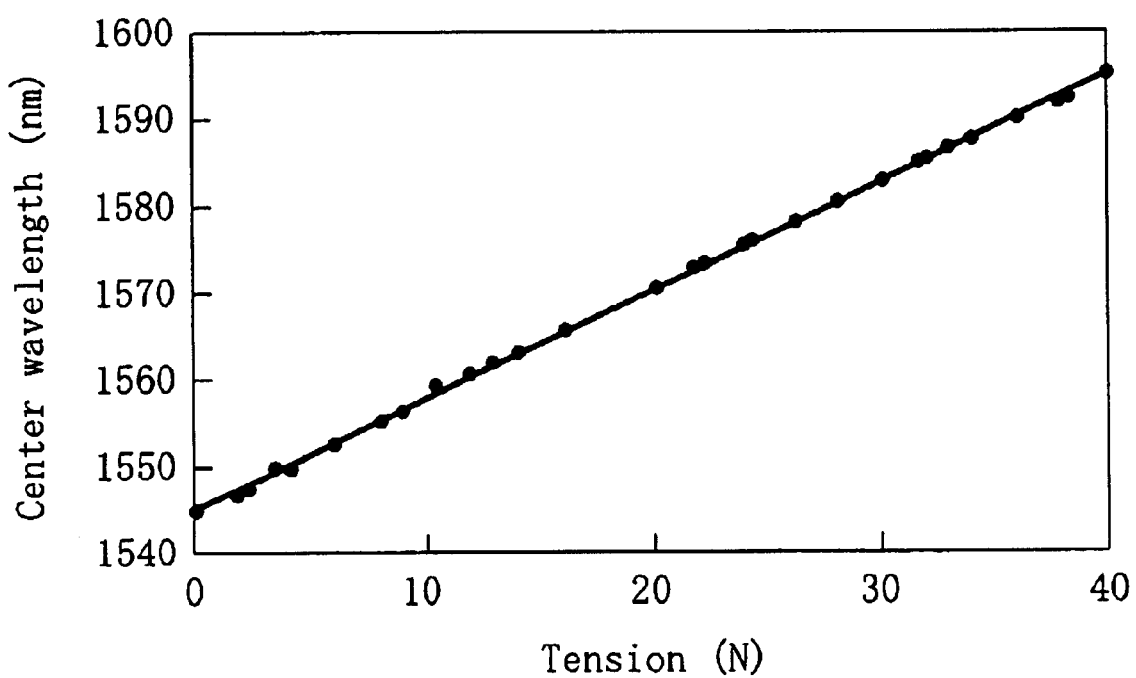
FIG. 17 is a diagram for showing the tension application characteristic of the center wavelength of the fiber grating.

The temperature dependence and the tension dependence of the center wavelength were obtained in a fabricated fiber grating, and the results are shown in FIGS. 16 and 17.

It was found through the measurement that the center wavelength linearly shifts (changes) in accordance with temperature change or tension change, and FIG. 16 shows that the temperature dependence is 0.011 nm/° C. and FIG. 17 shows that the tension dependence is 1.3 nm/N. Moreover, with respect to the tension dependence, the shift of the center wavelength was well reproduced even when a tensile force up to 40 N was repeatedly applied. Accordingly, the fiber grating is suitable for use as a temperature sensor or a tension sensor.

As described above, Embodiment 2 of the invention provides a fiber grating having a good transmitting characteristic with high reflectance as well as a mechanical strength characteristic equivalent to that of a coated fiber to be connected, attained by a coat layer with a large thickness. In addition, the strength degradation of a glass part and a coat layer accompanied by the UV irradiation can be minimized, so as to keep the mechanical strength characteristic. Accordingly, the transmitting characteristic and the mechanical strength characteristic can be consistent with each other without conducting any supplementary treatment after the UV irradiation, resulting in improving the productivity.

Furthermore, the irradiation can be uniformly conducted at a predetermined irradiation density without damaging the coat layer. Additionally, by placing a coated fiber, that is, the target for writing, in such a position that the outer face of the coat layer is internally in contact with the outer edge of the beam pattern, the UV can be irradiated at the highest irradiation density within the range for avoiding the damage of the coat layer. As a result, the process for writing a grating can be completed in a short period of time and the fiber grating can be efficiently fabricated.

Embodiment 3

In the phase mask method, a phase mask corresponding to a required frequency characteristic is prepared and an optical fiber is irradiated with UV through the phase mask, so as to control the frequency characteristic of the resultant fiber grating as desired. Also, a method of shifting a written grating pitch toward a longer wavelength is known, in which after writing the grating through the UV irradiation, a tensile force is applied to the fiber grating in which the grating has been written in the fiber axial direction so that the tensile strain can remain in the fiber grating (Hiroyuki Uno, et al., "Bragg wavelength Timing of Fiber Grating with Tensile Strain", The Institute of Electronics, Information and Communication Engineers, National Conference 1998, C-3-123, p. 289, March 1998). In other words, by shifting the grating pitch toward a longer wavelength, the wavelength reflected by the grating (reflective peak wavelength) can be shifted toward a longer wavelength.

In the case where the tensile force is applied after writing the grating, however, strain of the tensile side is caused, and hence, although the written grating pitch can be shifted toward a longer wavelength for controlling the wavelength characteristic, there arises a critical problem that the written grating pitch cannot be controlled to be shifted toward a shorter wavelength.

Moreover, in the method of shifting the wavelength characteristic toward a longer wavelength, it is necessary to fix the state where the tensile strain remains in the fiber grating by using, for example, adhering or fixing means in order to keep the wavelength shift, which restricts the structures of apparatuses employed in the aforementioned various uses.

In addition, it is necessary to apply the tensile force by means or a method not damaging the optical fiber as well as by means or a method not for testing facility but capable of mass production.

Furthermore, in writing the grating through the UV irradiation, refractive index modulation fringes are generated by causing photo-induced refractive index change in the core of the optical fiber through the UV irradiation. Therefore, in the optical fiber irradiated with UV, the coat layer in a portion irradiated with UV is generally removed from the viewpoint of causing effective photo-induced refractive index change in the core. Accordingly, in the conventional method in which a grating is written in a non-coated fiber including a core and a cladding bearing no coat layer thereon and a tensile force is applied after the writing, it is necessary to set the upper limit of the applied tensile force to a tension value (tension load value) sufficiently small to avoid possibility of fracture of the non-coated fiber. Since the non-coated fiber is generally broken when the expansion exceeds approximately 1%, the applied tensile force is limited to a low tension range where the expansion is smaller than 1%. As a result, the shift toward a longer wavelength can be small in accordance with the small tensile force. The tension load value corresponding to the expansion of 1% is approximately 1 kg in a general non-coated fiber, and it is reported on this point in the paper on the method for applying the tensile force after writing the grating that the shift of the wavelength is as small as 5.4 nm in applying a tensile force of 0.5 kg. It is also described that the wavelength shift increases substantially in proportion to the increase of the tension load value.

In general fabrication of optical fibers, the fabricated optical fibers are generally subjected to a screening test for the mechanical characteristic. In fabrication of fiber gratings, however, although a test method for the transmitting performance such as a wavelength characteristic has been almost settled, a test method for a mechanical characteristic such as strength has not been settled yet. Fiber gratings fabricated by using a fiber grating fabrication apparatus equipped with a UV irradiation system or the like can be possibly subjected to a screening test using a screening tester used for general optical fibers. In this case, however, the fabrication of fiber gratings and the screening test are independently carried out, which makes the process and work troublesome.

According to the invention described below, the wavelength characteristic can be controlled to be shifted toward a shorter wavelength by using a method for applying a tensile force. In addition, a large tensile force can be applied so as to increase the shift of the wavelength characteristic, the controllable range of the wavelength characteristic can be enlarged, the test for the mechanical characteristic by the screening test can be conducted after the fabrication of a fiber grating by using the same fabrication apparatus in continuous procedures, and a fiber grating fabrication apparatus utilizing shift of the wavelength characteristic (wavelength control) suitable for mass production can be provided.

Now, an embodiment of the invention will be described on the basis of the accompanying drawings.

Figure 18:
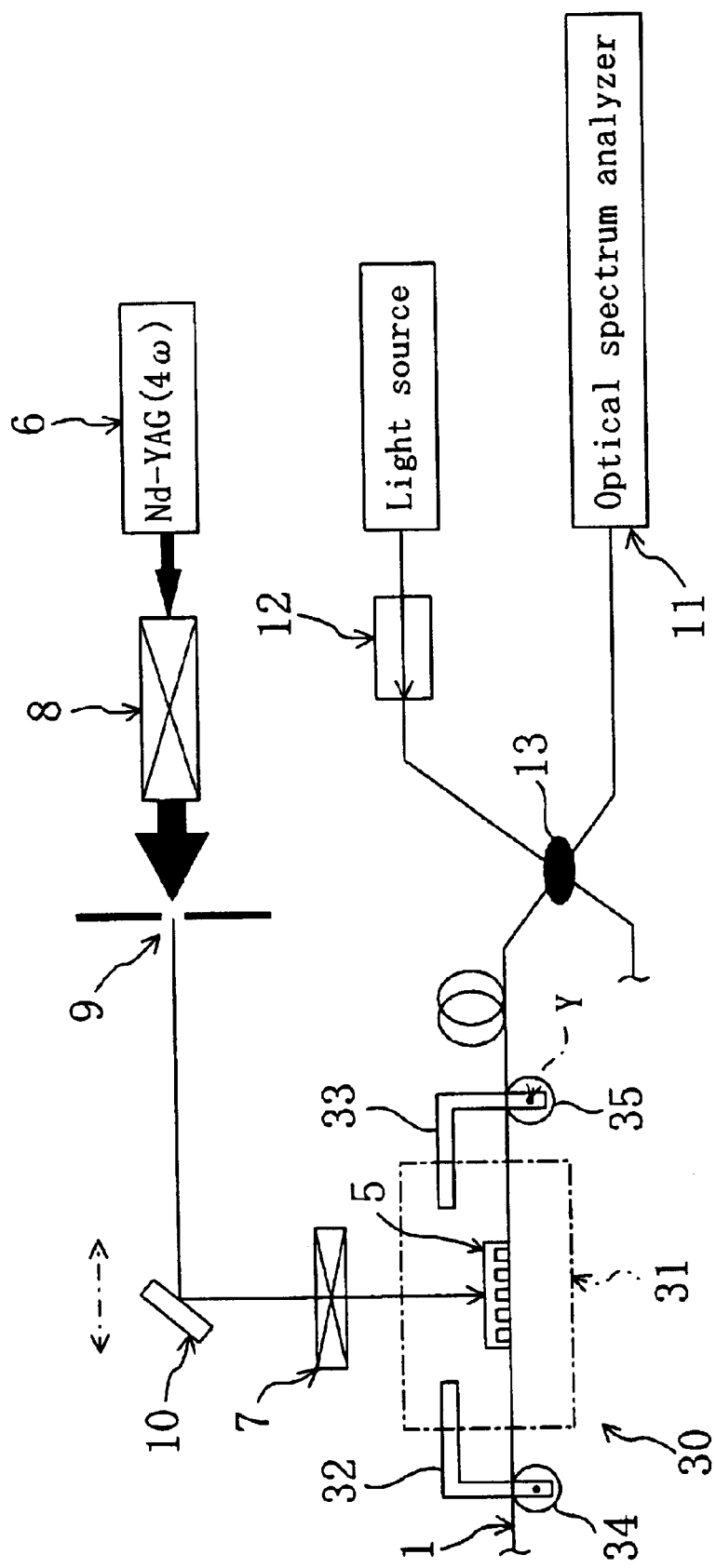
FIG. 18 is a schematic diagram for showing a fiber grating fabrication apparatus according to an embodiment of the invention.

First, a fiber grating fabrication apparatus capable of shift control of the wavelength characteristic using a coated fiber 1 will be described with reference to FIG. 18. The writing of a grating 21 through UV irradiation can be conducted any of various known methods. FIG. 18 exemplifies the case where it is written by the phase mask method.

In the fiber grating fabrication apparatus of FIG. 18, a phase mask 5 in a grating shape is disposed on the immediate side of the coated fiber 1, and a Nd-YAG laser source 6 is used for irradiating the phase mask 5 with a coherent UV laser beam of, for example, 266 nm, that is, a frequency-quadrupled wavelength (4ω) of the laser source, with the laser beam converged by using a cylindrical lens system 7. In this manner, the UV laser beam transmits the phase mask 5 and a coat layer 4, so as to write the grating 21 in the core 2 by increasing the refractive index of a portion of a grating pitch corresponding to the grating pitch of the phase mask 5. In FIG. 18, a reference numeral "8" denotes a beam expander for expanding the UV laser beam into a parallel beam, a reference numeral "9" denotes a slit with a small width for taking out a part with uniform power of the UV laser beam changed into the parallel beam, and a reference numeral "10" denotes a movable reflecting mirror movable along the fiber axial direction (shown with a dashed arrow) of the coated fiber 1.

The phase mask 5, the Nd-YAG laser source 6, the cylindrical lens system 7, the beam expander 8, the slit 9 and the movable reflecting mirror 10 together form a u irradiation system. Also, a reference numeral "11" denotes an optical spectrum analyzer, a reference numeral "12" denotes an optical isolator and a reference numeral "13" denotes an optical coupler, all of which together correspond to a part for testing the wavelength characteristic of a fabricated fiber grating.

Figure 19:
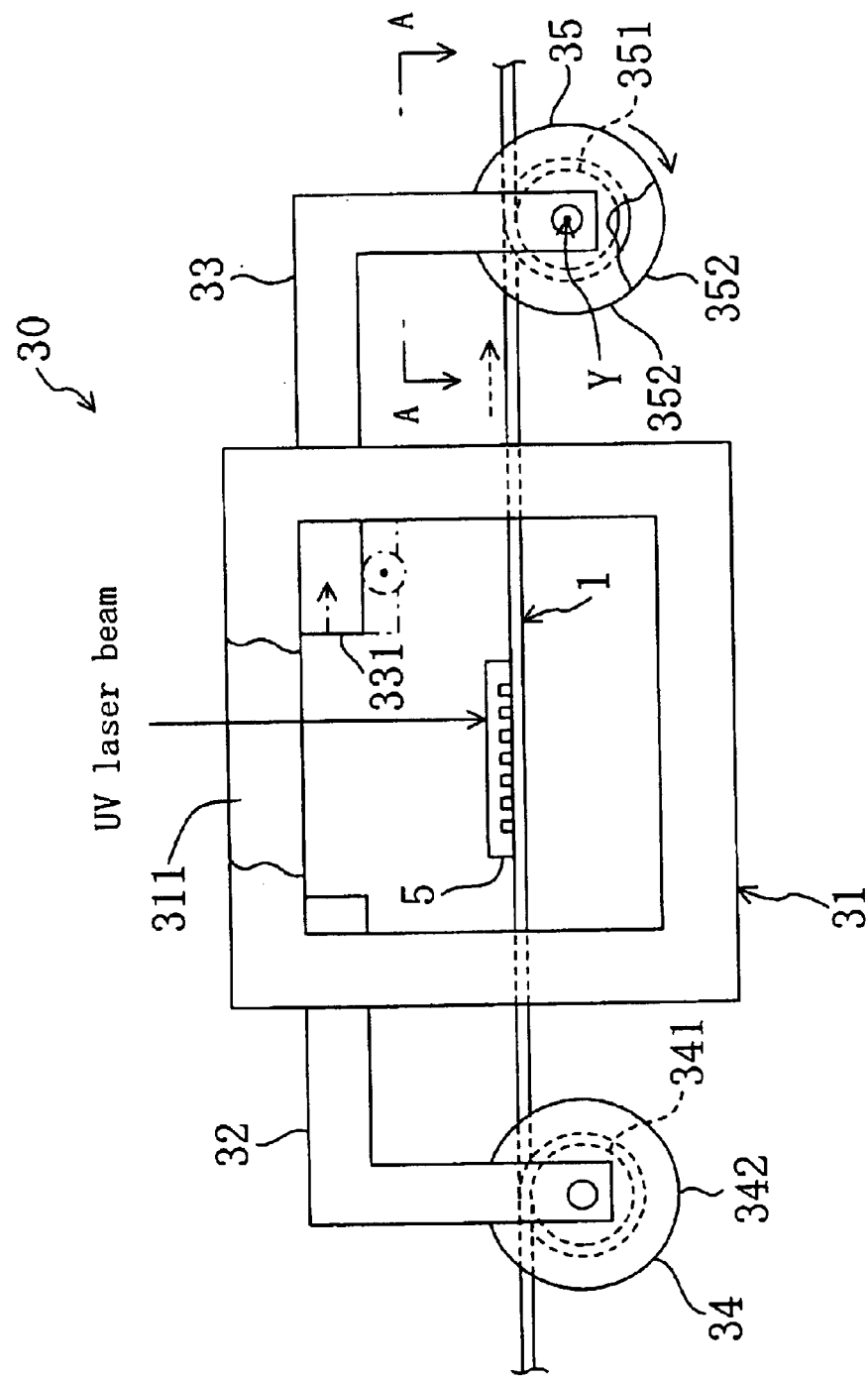
FIG. 19 is an enlarged explanatory diagram of a tension applying mechanism of FIG. 18.

In this embodiment, a tension applying mechanism 30 is additionally provided for applying a tensile force to the coated fiber 1 in the fiber axial direction. The tension applying mechanism 30 includes, as shown in detail in FIG. 19, a frame 31 disposed so as to surround a UV irradiated portion of the coated fiber 1; a pair of arm members 32 and 33 projecting from both sides of the frame 31 in the fiber axial direction of the coated fiber 1; a pair of winding reels 34 and 35, serving as fixing means, supported at the tips of the arm members 32 and 33, respectively; and a motor 36 (shown in FIG. 20) for driving the winding reel 35 disposed on one side along the fiber axial direction (on the right hand side in FIG. 19).

The frame 31 is not specified in its shape or the like as far as it has an opening 311 for transmitting the UV laser beam at least in a portion behind the coated fiber 1 (an upper portion in FIG. 19) and can support the pair of arm members 32 and 33. Each of the arm members 32 and 33 is in an L-shape, with one end fixed on the frame 31 and the other end connected to the winding reel 34 or 35. Each of the winding reels 34 and 35 includes a mandrel 341 or 351 corresponding to a winding reel main body and a pair of flange portions 342 or 352 provided on both sides of the mandrel. The winding reel 34 disposed on one side along the fiber axial direction (on the right hand side in FIG. 19) is connected rotatably around an axis Y provided on the arm member 33 in a direction perpendicular to the fiber axial direction, while the winding reel 34 disposed on the other side along the fiber axial direction (on the left hand side in FIG. 19) is fixed so as not to rotate relatively to the arm member 32. The motor 36 is constructed from a pulse motor, whose output axis is connected to the mandrel 351 directly or through a connection member. The motor 36 forcedly rotates the mandrel 351 by predetermined revolutions in response to a control signal supplied from a controller not shown.

Next, a method of fabricating a fiber grating by using the fiber grating fabrication apparatus will be described.

Figure 20:
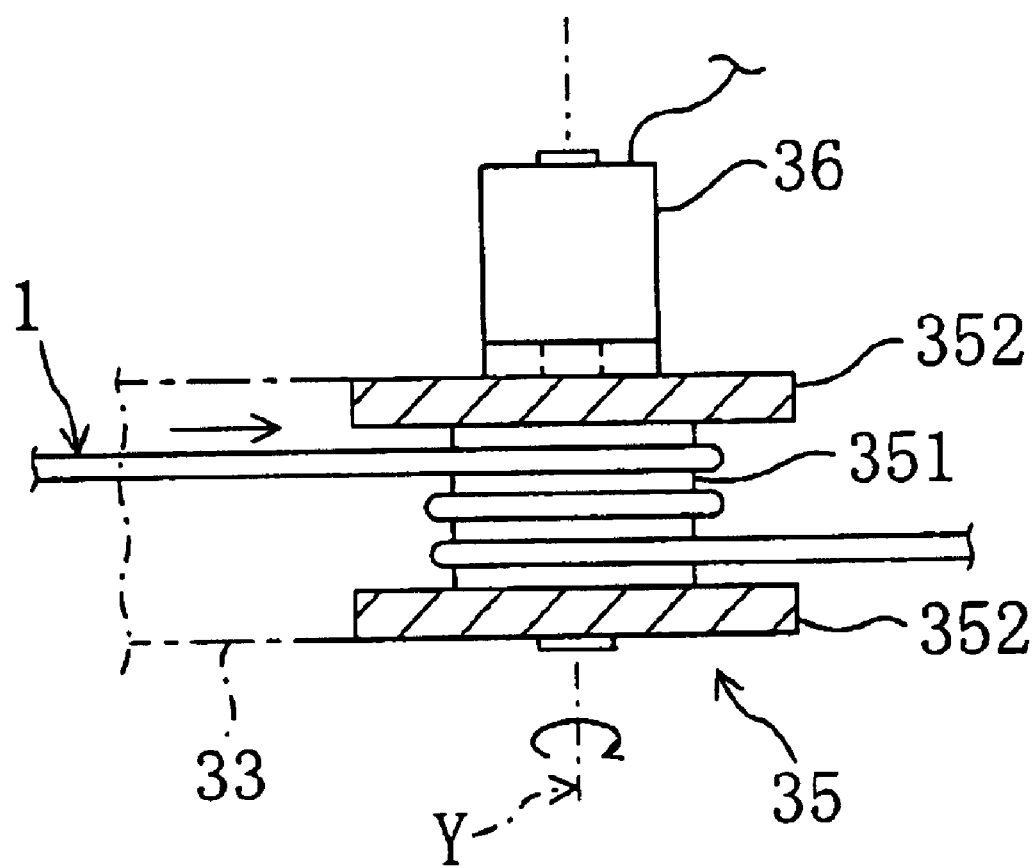
FIG. 20 is an enlarged sectional view taken on line A—A of FIG. 19.

In the fabrication of a fiber grating, a tension application process, an irradiation process, a tension release process and a screening process are successively carried out. Specifically, in the tension application process, the coated fiber 1 is set in a linearly expanded state by respectively winding both end portions, sandwiching a portion where the grating 21 is to be written, of the coated fiber 1 around the circumferences of the mandrels 341 and 351 of the winding reels 34 and 35 twice or three times so as not to overlap the wound portions (as shown in FIG. 20). In this manner, the coated fiber 1 is fixed on the circumferences of the mandrels 341 and 351 so as not to move along the fiber axial direction by frictional resistance between the circumferences of the mandrels 341 and 351 of the winding reels 34 and 35 and the outer face of the coated fiber 1. Next, the motor 36 is driven so as to forcedly rotate the mandrel 351 by the predetermined revolutions and keep the rotated state. Thus, the portion of the coated fiber 1 between the pair of mandrels 341 and 351 is forcedly extended along the fiber axial direction by a circumferential length of the mandrel 351 corresponding to the forced revolutions, namely, a tensile force is applied so as to cause elastic strain (expansion strain) of the tensile side in the core 2. Under this condition, the subsequent irradiation process is carried out.

In the irradiation process, the phase mask 5 is set on the portion of the coated fiber 1 where the grating 21 is to be written, and the UV laser beam emitted from the UV irradiation system irradiates the coated fiber 1 through the phase mask 5 over the range between one end of the phase mask 5 in the fiber axial direction and the other end thereof. The irradiating position of the UV laser beam is changed within the range along the fiber axial direction by moving the reflecting mirror 10 along the fiber axial direction. In this manner, the grating 21 with a grating pitch corresponding to the grating pitch of the phase grating 5 is written through the UV laser beam irradiation in the core 2 in which the expansion strain is caused.

After writing the grating 21 in the irradiation process, the tension release process is conducted, in which the motor 36 is reversely driven by the predetermined revolutions so that the coated fiber 1 can be returned to the original state prior to the application of the tensile force to be restored to a no-load state. In this manner, the expansion strain caused in the core 2 restores to the original state, namely, the core is shrunken, and the grating pitch of the written grating 21 is narrowed in accordance with the shrinkage. Therefore, the wavelength characteristic of the grating 21 is shifted toward a shorter wavelength correspondingly to the narrowed grating pitch.

Thus, the fabrication of a fiber grating itself is completed, but in this embodiment, the screening process is subsequently conducted. Specifically, in the screening process, the motor 36 of the tension applying mechanism 30 is driven so as to cause given expansion strain along the fiber axial direction in the fiber grating for a predetermined time period, thereby conducting a screening test for the mechanical strength characteristic. In this manner, a fiber grating with a defect is omitted from products, with merely fiber gratings free from a defect remaining as the products. Thus, in the fabrication of a fiber grating, the formation of the grating 21 whose wavelength characteristic is shift-controlled as well as the screening of the fiber grating including the grating 21 can be conducted by using the same fabrication apparatus in continuous procedures. Accordingly, fiber grating fabrication apparatus and method suitable for mass production of fiber gratings can be provided.

In the shift control of the wavelength characteristic toward a shorter wavelength realized through the tension application process, the irradiation process and the tension release process, the coat layer 4 is formed on the coated fiber 1 where the grating 21 is written, and therefore, the tensile force applied in the tension application process can be set to a much larger value than the case where the non-coated fiber 1' excluding the coat layer 4 is used. Accordingly, the irradiation process can be conducted under application of a large tensile force, namely, in the state where large expansion strain is caused in the core 2, and hence, the shrinkage of the core 2 attained in the tension release process, namely, the degree of narrowing the grating pitch, can be large. As a result, the shift of the wavelength characteristic toward a shorter wavelength of the fiber grating attained after the tension release process can be very large, and thus, the shift control toward a shorter wavelength can be carried out over a very large wavelength range.

In the actual shift control of the wavelength characteristic (wavelength control), the relationship between an applied tensile force and shift of the wavelength characteristic toward a shorter wavelength is previously obtained through a test, so that an applied tensile force corresponding to the shift of the wavelength desired to be controlled can be predetermined on the basis of the relationship, and the predetermined revolutions of the motor 36 can be decided so as to apply the predetermined tensile force to the coated fiber 1.

In the fabrication of a fiber grating, the UV irradiation may be conducted as follows in order to write the grating 21 more definitely by the UV laser beam irradiation through the coat layer 4:

The UV laser beam irradiation is conducted at an irradiation energy density of approximately 1.5 kJ/cm$^2$. Thus, in the UV laser beam irradiation through the coat layer 4, even when the coat layer 4 has a thickness as large as approximately 30 $\mu$m or more, the UV laser beam can transmit the coat layer 4 so as to cause the high refractive index modulation in the core 2, resulting in writing the grating 21 with high reflectance.

In addition, the coated fiber 1 where the grating is to be written is placed in the specific position relative to the beam pattern BP of the UV laser beam converged by the cylindrical lens system 7 as shown in FIG. 11, and is irradiated with the UV laser beam under this condition. The beam pattern BP is formed by converging the parallel beam having passed through the cylindrical lens system 7 toward the focal point F, and the coated fiber 1 is placed so that the entire coated fiber 1 can be disposed within the beam pattern BP and that the outer face of the coat layer 4 of the coated fiber 1 can be internally in contact with the outer edge of the beam pattern BP. As far as such a positional relationship is satisfied, the coated fiber 1 can be placed in front of the focal point P as is shown with the solid line in FIG. 11 or behind the focal point F as is shown with the dashed line in FIG. 11. For example, when the focal distance L1 is 100 mm, a coated fiber 1 with an outer diameter of 200 $\mu$m may be placed on the optical axis away from the focal point F by a distance L2 substantially corresponding to 2 mm. By placing the entire coated fiber 1 within the beam pattern BP, the entire coat layer 4 can be irradiated with the UV laser beam at a uniform irradiation energy density. Moreover, local damage (strength degradation) of the coat layer 4, which can be occasionally caused in placing the coated fiber 1 closer to the focal point F, can be prevented, and the coated fiber 1 can be irradiated in a position for attaining the highest irradiation energy density within the range for avoiding the strength degradation, resulting in shortening the time required for writing the grating.

In the aforementioned embodiment, the tensile force is applied by the tension applying mechanism by forcedly rotating one winding reel 35 by using the motor 36 with the winding reel 35 rotatably supported on the arm member 33, which does not limit the invention. The tensile force can be applied to the coated fiber 1 by constructing the apparatus as followings: Both the winding reels 34 and 35 are respectively fixed on the arm members 32 and 33 so as not to rotate, one end 331 of one arm member 33 is guided and supported on the frame 31 movably in the fiber axial direction as shown with a dashed line in FIG. 19, and the arm member 33 is forcedly moved in the rightward direction in FIG. 19 by using, for example, a combination of a transmitting mechanism such as a rack and a pinion, and a motor, or an actuator such as a hydropneumatic cylinder.

As described above, Embodiment 3 of the invention realizes the shift control of the wavelength characteristic toward a shorter wavelength, which cannot be realized by the conventional tension applying method for keeping application of a tensile force after writing a grating. Also, the wavelength characteristic of a fiber grating can be stably shifted toward a shorter wavelength. In addition, as compared with the conventional tension applying method, there is no need to keep the tension application in the individual optical fiber where the grating has been written, and hence, a fiber grating easy to deal with and controlled in the wavelength by the tension application can be easily mass produced.

Furthermore, since a coated fiber bearing a coat layer is used as an optical fiber for fabricating a fiber grating, a much larger tensile force can be applied than in use of a non-coated fiber without a coat layer, and therefore, the shift of the wavelength characteristic toward a shorter wavelength can be increased, and the range of the wavelength control can be largely increased.

Moreover, since the screening process for conducting a screening test is continuously conducted by applying a predetermined tensile force to a portion where the grating has been written in the fabricated fiber grating, a test for the mechanical characteristic of the portion where the grating has been written with the wavelength controlled, namely, a test for the strength and surface damage, can be carried out following the fabrication of the fiber grating. Thus, a suitable mass production system for fiber gratings with the wavelength control is provided. Furthermore, according to the fiber grating fabrication apparatus of this invention, even when the irradiation process and the screening process alone are conducted, the writing of a grating and the screening test of the fiber grating where the grating has been written can be carried out by using the same fabrication apparatus.

Industrial Applicability

The present invention provides a fiber grating (including a short-period fiber grating and a long-period fiber grating) in which a grating can be easily written without causing degradation of the transmitting characteristic. Also, the invention stabilizes not only the transmitting characteristic but also the temperature characteristic, so as to provide a highly reliable fiber grating. Accordingly, the transmitting characteristic and the mechanical strength characteristic can be improved without spoiling the improvement of productivity.

What is claimed is:

1. A fiber grating comprising a core where a grating is written, a cladding for covering the core, and a coat layer for coating an outer face of the cladding, wherein the coat layer is made from a UV transmitting resin and has a characteristic of transmitting UV at least of a specific wavelength band used for writing the grating and of curing by absorbing UV of a shorter wavelength band or a longer wavelength band than the specific wavelength band, and the grating is written by irradiating the core with the UV of the specific wavelength band through the coat layer, wherein the core is co-doped with Ge and Sn, and a concentration of Ge is substantially the same as a concentration of Ge included in a core of another optical fiber to be connected to the fiber grating.

2. The fiber grating of claim 1, further comprising a secondary coat layer for coating an outer face of the coat layer, wherein the secondary coat layer is made from a material having a negative coefficient of linear expansion.

3. The fiber grating of claim 1, wherein the coat layer is formed from a sing coat film with a thickness of 30 $\mu$m or more.

4. The fiber grating of claim 1, wherein the core is further doped with Al.

5. A method of fabricating a fiber grating comprising the steps of:

fabricating a glass fiber structure including a core where a grating is to be written and a cladding for covering the core;

forming a coat layer of a UV transmitting resin for covering an outer face of the glass fiber structure; and writing the grating in the core by irradiating the core with first UV through the core layer of which wavelength is longer than 260 nm and shorter than or equal to 350 nm, wherein the step of forming the coat layer includes a step of curing the UV transmitting resin through irradiation with second UV having a different wavelength from the first UV, and wherein in the step of fabricating the glass fiber structure, the core of the glass fiber structure is codoped with Ge and Sn, and a concentration of Ge is substantially the same as a concentration of Ge included in a core of another optical fiber to be connected to the fiber grating.

6. The method of fabricating a fiber grating of claim 5, wherein the coat layer is formed by a single coating method in a thickness of 30 µm through 50 µm.

7. The method of fabricating a fiber grating of claim 5, wherein the core is loaded with hydrogen before irradiating with the first UV.

8. The method of fabricating a fiber grating of claim 5, wherein the core is co-doped with GE and Sn.

9. A method of fabricating a fiber grating comprising the steps of:

fabricating a glass fiber structure including a core where a grating is to be written and a cladding for covering the core:

forming a coat layer of a UV transmitting resin for covering an outer face of the glass fiber structure; and writing the grating in the core by irradiating the core with first UV through the coat layer, wherein in the step of fabricating the glass fiber structure, the core of the glass fiber structure is co-doped with Ge and Sn, and a concentration of Ge is substantially the same as a concentration of Ge included in a core of another optical fiber to be connected to the fiber grating, and the step of writing the grating includes steps of:

placing all the coat layer, the cladding and the core in a position between a cylindrical lens and a focal point of the cylindrical lens and within a beam pattern of the UV converged toward the focal point by the cylindrical lens; and irradiating the core with the UV through the cylindrical lens.

10. A method of fabricating a fiber grating comprising the steps of:

fabricating a glass fiber structure including a core where a grating is to be written and a cladding for covering the core:

forming a coat layer of a UV transmitting resin for covering an outer face of the glass fiber structure; and writing the grating in the core by irradiating the core with first UV through the coat layer, wherein in the step of fabricating the glass fiber structure, the core of the glass fiber structure is co-doped with Ge and Sn, and a concentration of Ge is substantially the same as a concentration of Ge included in a core of another optical fiber to be connected to the fiber grating, and in the step of writing the grating, an outer face of the coat layer is internally in contact with an outer edge of a beam pattern of the UV.

* * * * *